US012692184B2

(12) United States Patent
Sumi et al.

(10) Patent No.: US 12,692,184 B2
(45) Date of Patent: Jul. 28, 2026

(54) LARGE-SIZED HOLLOW POROUS QUARTZ GLASS PREFORM AND METHOD OF MANUFACTURING THE SAME

(71) Applicant: SHIN-ETSU QUARTZ PRODUCTS CO., LTD., Tokyo (JP)

(72) Inventors: Kotaro Sumi, Nagasaki (JP); Hikari Kuwahara, Nagasaki (JP)

(73) Assignee: SHIN-ETSU QUARTZ PRODUCTS CO., LTD., Tokyo (JP)

( * ) Notice: Subject to any disclaimer, the term of this patent is extended or adjusted under 35 U.S.C. 154(b) by 1087 days.

(21) Appl. No.: 17/374,131

(22) Filed: Jul. 13, 2021

(65) Prior Publication Data

US 2022/0017404 A1 Jan. 20, 2022

(30) Foreign Application Priority Data

Jul. 15, 2020 (JP) ................................. 2020-121187

(51) Int. Cl.
*C03B 37/014* (2006.01)

(52) U.S. Cl.
CPC .. *C03B 37/01493* (2013.01); *C03B 37/01406* (2013.01); *C03B 2201/04* (2013.01);
(Continued)

(58) Field of Classification Search
None
See application file for complete search history.

(56) References Cited

U.S. PATENT DOCUMENTS 5,788,730 A * 8/1998 Ruppert .............. C03B 19/1423
65/17.4
6,047,564 A 4/2000 Schaper et al.
(Continued)

FOREIGN PATENT DOCUMENTS

| CN | 1430584 | * | 7/2003 |
| JP | H03228845 A | | 10/1991 |

(Continued)

OTHER PUBLICATIONS

Machine Translation of JP2016003162 (Year: 2016).*
Machine Translation of JP2002160927 (Year: 2002).*
Machine Translation of CN1430584 (Year: 2003).*

*Primary Examiner* — Shawn Mckinnon
(74) *Attorney, Agent, or Firm* — McGlew and Tuttle, P.C.

(57) ABSTRACT

Provided are such a method of manufacturing a hollow synthetic quartz glass porous preform and method of manufacturing a synthetic quartz glass cylinder as described below: even a soot body having an outer diameter of more than 300 mm can be produced without significantly increasing a load on an apparatus, such as a centrifugal force generated during growth; even when manufactured at low-speed rotation, the soot body is free of any crack or rupture; and a target can be easily extracted. Specifically, provided is a method of manufacturing a hollow porous quartz glass preform by an OVD method, wherein the rotation peripheral speed of the soot body is controlled so as to be practically constant by fluctuating the rotation number of the soot body on the basis of a fluctuating outer diameter of the soot body during growth, and wherein a frequency factor γ calculated by the following equation is set so as to fall within the range of $0.13 \le \gamma < 1.0$ in a range in which the outer diameter of the soot body is more than 250 mm: $\gamma = S/(L \cdot N_m)$, where S represents the moving speed (mm/min) of the burners, L represents the moving distance (mm) of the burners, and $N_m$ represents the lowest value (rpm) of the rotation number of the soot body, which is fluctuated.

16 Claims, 6 Drawing Sheets

(52) U.S. Cl.
    CPC ...... *C03B 2203/16* (2013.01); *C03B 2207/66*
            (2013.01); *C03B 2207/70* (2013.01)

(56)            References Cited

U.S. PATENT DOCUMENTS

| | | | |
|---|---|---|---|
| 2002/0081377 A1 | 6/2002 | Ohishi et al. | |
| 2013/0115391 A1* | 5/2013 | Coapes | C03B 19/1484 |
| | | | 428/34.4 |
| 2014/0349830 A1 | 11/2014 | Trommer et al. | |

FOREIGN PATENT DOCUMENTS

| JP | 2001504426 A | | 4/2001 |
|---|---|---|---|
| JP | 2002160927 | * | 6/2002 |
| JP | 2002167228 A | | 6/2002 |
| JP | 2013043810 A | | 3/2013 |
| JP | 2013530920 A | | 8/2013 |
| JP | 2015505809 A | | 2/2015 |
| JP | 2016003162 | * | 1/2016 |

* cited by examiner

1

LARGE-SIZED HOLLOW POROUS QUARTZ GLASS PREFORM AND METHOD OF MANUFACTURING THE SAME

BACKGROUND OF THE INVENTION

1. Field of the Invention

The present invention relates to a large-sized hollow porous quartz glass preform and a method of manufacturing the same, and a hollow synthetic quartz glass cylinder using the same and a method of manufacturing the same, and more particularly, to a large-sized hollow porous quartz glass preform having an outer diameter of more than 300 mm and a large weight and a method of manufacturing a hollow porous quartz glass preform, by which the large-sized hollow porous quartz glass preform can be suitably manufactured, and a hollow synthetic quartz glass cylinder using the same and a method of manufacturing the same.

2. Description of the Related Art

Synthetic quartz glass is widely used in the optical, semiconductor, and chemical industries, and is often used particularly as a lens material for a projection or exposure system in microlithography, or a material for a semiconductor manufacturing jig or an optical fiber.

The manufacturing a hollow synthetic quartz glass cylinder generally involves manufacturing a hollow porous synthetic quartz glass preform (soot body), and making the preform transparent by sintering. In the manufacturing of a soot body, there is known an outside vapor deposition (OVD) method, according to which the soot body is manufactured by converting a silicon-containing raw material into fine $SiO_2$ particles through flame hydrolysis or thermal decomposition to deposit on an outer surface of a target rotating about its long axis.

The hollow porous quartz glass preform (soot body) needs to be subjected to an operation for extracting the target before sintering, and the extracting operation is performed by relatively rotating the target and the hollow soot body and moving the target and the hollow soot body in a long axis direction. When the soot body and the target are fixed to each other, the operation is extremely difficult. Further, even if the extraction can be performed by applying a large force, a flaw is formed on an inner surface of the soot body during the extraction, and the formed flaw remains as a local defect on the quartz cylinder after sintering as well to become a failure portion.

In recent years, as a result of an increase in diameter of a semiconductor wafer and an increase in size of an optical fiber preform, there has been an increasing demand for an increase in size of the quartz cylinder.

In order to manufacture a large-sized quartz cylinder, the hollow porous quartz glass preform (soot body) serving as an intermediate in the manufacturing is also required to be increased in size and weight. However, there has been a problem in that the increases in weight and diameter of the soot body make it difficult to perform the operation for extracting the target from the soot body. This means that it has been difficult to achieve both of the following: the target and the soot body are integrated with each other so that the soot body rotates in such a manner as to follow the target during growth of the soot body; and the target can be extracted from the soot body after the soot growth.

In addition, in the OVD method, the soot body may be obtained by: arranging a plurality of burners for synthesizing glass fine particles at constant intervals; and subjecting the row of the burner to reciprocating movement (swing) relative to a rotating starting member (target) to deposit glass fine particles on the target in the form of a layer. At a turning point of the swing, a swing speed momentarily becomes zero, and hence a period of time for which flame is actually applied is longer than at a portion where the swing is at a steady-state speed. Accordingly, at the turning point, the glass fine particles are deposited in a large amount to cause unevenness in the long axis direction. Accordingly, in Patent Document 1, there is a description of a traverse method for obtaining a soot body whose outer diameter is uniform in its long axis direction by moving the turning position of the swing by predetermined distances in order to disperse deposition in the long axis direction, and such traverse method is known as a method of dispersing a deposition amount or a density distribution.

In addition, in the OVD method, deposition on the outer surface of the target is performed while the target is rotated about the long axis, and hence, when the rotation number of the soot body is made constant, a peripheral speed of an outer surface of the soot body increases along with growth of the outer diameter of the soot body to shorten an application time per unit area. Accordingly, a soot body that is homogeneous in its radial direction cannot be obtained. Nowadays, while an increase in diameter and thickening being advanced in order to streamline productivity and reduce cost, the influence thereof is particularly remarkable on a large-diameter soot body having an outer diameter of more than 300 mm, and there is a need for such control as to decrease the rotation number along with the growth of the outer diameter of the soot body so as to make the peripheral speed constant. Further, even if the peripheral speed is constant, in the case where the speed is equal to or higher than a certain speed, vibration occurs owing to slight eccentricity of center of gravity in the radial direction upon an increase in outer diameter at a late stage of the growth, and along with this, a load on a rotary apparatus is increased, with the result that stable manufacturing becomes impossible. Further, in the case where the peripheral speed is equal to or higher than the certain speed, there arises a problem in that the soot body fails to follow the rotation of the target to cause idle rotation at an interface between the soot body and the target, with the result the soot body cannot be stably rotated at a constant speed. This problem can be avoided by firmly fixing the soot body to the target. In that case, however, the above-mentioned operation for extracting the target becomes extremely difficult, and even when the target can be extracted, a local defect occurs. Accordingly, a constant-peripheral speed condition at a low rotation number is essential.

However, in the case of adopting an increased size and adopting a low-rotation condition to make the peripheral speed constant, there have been many instances of crack occurrence and rupture during growth or after completion of growth. Further, even in a case that is not as extremely as the foregoing, when treatment with a chlorinating agent is performed, a chlorine content concentration distribution of the synthetic quartz glass cylinder after sintering becomes nonuniform, and when the treatment with a chlorinating agent is not performed, an OH group content concentration distribution becomes nonuniform. Accordingly, a quartz glass cylinder having optically homogeneous physical properties cannot be obtained.

In the manufacturing of an optical fiber, differences in chlorine concentration in the radial direction and a peripheral direction are important. In particular, it has been revealed through investigations in recent years that a fiber curl is improved by reducing a difference in chlorine concentration distribution in the peripheral direction. When a large-diameter preform is drawn, a drawing amount per unit length is increased and a deformation time in a drawing furnace also is increased. Accordingly, the influence of local homogeneity at a cladding portion on properties of the fiber is increased, and hence, when the size of the cladding glass preform is increased, the stability of the chlorine concentration in a small-scale range becomes more important.

A quartz glass cylinder manufactured without chlorinating treatment is often used as a raw material for a material for a quartz glass jig or lamp to be used in a semiconductor-manufacturing apparatus. Molding or thermal processing into a desired size is performed in order to obtain such quartz glass raw material, but at this time, a large difference in OH group concentration generates a viscosity distribution in the cylinder, resulting in shape instability problems, such as thickness unevenness, siding, and an oval. This problem also appears more remarkably when the glass size is increased, as with the above-mentioned optical fiber, and hence it is important that the OH group concentration in a small-scale range be stable.

With regard to the reciprocating motion of burners and the rotation of a support in the OVD method, in Patent Document 2, there is a description that a base temperature of a surface is kept between 1,050° C. and 1,350° C., an average peripheral speed is kept at from 8 m/min to 15 m/min, and a translational speed (swing speed) of a burner row is kept between 300 mm/min and 800 mm/min, to thereby make possible the production of a preform largely free of localized axial density fluctuations. However, in the method described in Patent Document 2, for example, in the case of adopting a swing distance of 100 mm, a swing speed of 800 mm/min, and an average peripheral speed of 9 m/min, when the outer diameter (hereinafter sometimes represented by "OD") of a deposit is grown from 100 mm to 300 mm, the rotation number needs to be changed from 19.1 rpm to 6.4 rpm. However, when manufacturing is performed under the above-mentioned conditions, a crack is formed during growth to preclude continuation of the growth.

In addition, in Patent Document 3, there is a description of a method involving moving a turning position of reciprocating motion by predetermined distances in a certain direction and moving the turning position in an opposite direction at predetermined position, in which a rotation speed is made constant and conditions are set so as to satisfy the following relationship, to thereby suppress outer diameter fluctuation (unevenness in the axial direction of soot).

A value represented by $A=(r/v)\times L$ satisfies $40 \geq A \geq 8$.

[r=rotation number (rpm), v=reciprocating moving speed (mm/min), L=burner interval.]

In the method described in Patent Document 3, for example, in the case of a swing speed of 850 mm/min and a swing width of 100 mm, the rotation number "r" (rpm) needs to be set to satisfy $68 \leq r \leq 320$ in order for A to fall within the specified range. However, when the deposit has a large outer diameter, for example, an OD of 300 mm, the surface peripheral speed "p" (m/min) is as high as $64 \leq p \leq 301$, resulting in a strong centrifugal force. As increases in weight and diameter are advanced, the force increases.

Accordingly, there have been problems in that vibration is generated, an apparatus and a target each having rigidity enough to withstand the centrifugal force need to be used, resulting in an increase in cost, and a crack occurs during growth. Further, Patent Document 3 is directed to a method of manufacturing a solid optical fiber preform by depositing quartz glass fine particles on a surface of a starting rod, and is not directed to manufacturing a hollow porous quartz glass preform. In the method described in Patent Document 3, in order to manufacture a soot body having an outer diameter of 300 mm or more without causing idle rotation between its interface with the target, the target and the soot body need to be firmly fixed to each other. In that case, there has also been a problem in that the operation of extracting the target is difficult.

In addition, in Patent Document 4, there is a description that fluctuation in diameter in a longitudinal direction is suppressed by setting a reciprocating moving speed (swing speed) and a rotation speed so that, when relative reciprocating movement (swing) of a starting rod and burners completes one to-and-fro cycle to return to an original position, a rotation position of the starting rod shifts from the original position by a half-cycle, and there is a description of the following conditions.

$$(L/V)\times N \text{ (rpm)}=n+0.5\pm0.1$$

[L=moving distance (mm), V=reciprocating moving speed (mm/min), N=rotation number (rpm) of rod, n: any integer.]

In the method described in Patent Document 4, a shift of 0.5 rotation period (180°) is made when one to-and-fro cycle is completed, and hence the rotation position shifts by one rotation (360°) when two to-and-fro cycles are completed. For example, in the case of a swing speed of 850 mm/min and a swing width of 100 mm, the above-mentioned equation is satisfied when the rotation number is 12.75 rpm (100 mm/850 mm/min×12.75 rpm=1.5). However, in the above-mentioned case of 12.75 rpm, the timings of the turning position of the swing and one rotation of the rotation coincide with each other once every three rotations, and hence density distributions are formed in the soot body in both of its long axis direction and radial direction. Further, Patent Document 4 is also directed to a method of manufacturing a solid glass fine particle deposit by depositing glass fine particles on a surface of a starting rod, and is not directed to manufacturing a hollow porous quartz glass preform.

As described above, none of the patent documents is directed to an invention in which the local density distribution of a soot body under a low-rotation number condition that allows a target to be extracted from a soot body increased in diameter and having an outer diameter of more than 300 mm is described, and in which the local density distribution is eliminated to suppress crack occurrence.

PRIOR ART DOCUMENTS

Patent Document

Patent Document 1: JP Hei 3-228845A
Patent Document 2: JP 2001-504426A
Patent Document 3: JP 2002-167228A
Patent Document 4: JP 2013-43810A

SUMMARY OF THE INVENTION

An object of the present invention is to provide such a large-sized hollow synthetic quartz glass porous preform and method of manufacturing the same, and hollow synthetic quartz glass cylinder and method of manufacturing the same, as described below: even a soot body having an outer diameter of more than 300 mm can be produced without significantly increasing a load on an apparatus, such as a centrifugal force generated during growth; the local density distribution of the soot body under constant-peripheral speed and low-rotation number conditions caused by an increase in diameter of the soot body to an outer diameter of more than 300 mm is eliminated; even when manufactured at low-speed rotation, the soot body is free of any crack or rupture; and the target can be easily extracted from the soot body increased in diameter.

A soot body has been investigated in order to solve the above-mentioned problem, and as a result, it has been found that there is a difference in density of a deposited layer as well as in deposition amount at a turning position of recip-rocating movement of burners in the soot body. In at least one embodiment of the present invention, the reciprocating movement of the burners is referred to as "swing". FIG. 4 is a graph for showing turning positions of the reciprocating movement (swing) of the burners and the density distribu-tion of the deposited layer in the long axis direction of the soot body. As shown in FIG. 4, the density becomes higher at the turning positions of the burners than during movement at a swing speed that is a steady-state speed, and this is repeated during deposition to generate an axial-direction density distribution in the soot body.

A further investigation has revealed that a local density difference is strongly formed in a radial direction as well as in the axial direction. The results of detailed analysis of the local density fluctuation in the radial direction have revealed the occurrence of a timing at which a turning point of the swing and one rotation of the rotation coincide with each other. FIG. 5 is a graph for showing the density distribution of the soot body in its radial direction. As shown in FIG. 5, it has been found that, in general, swing turning positions at which the density becomes high are dispersed in a peripheral direction, but when growth is performed for a certain period of time or more under a state in which the timings of turning of the swing and one rotation coincide with each other, there is a site with an extremely low density, where a high-density region is not dispersed and a site with a high density and a low-density region overlap each other in the peripheral direction. In FIG. 5, γ represents a frequency factor calcu-lated by the following equation (1).

$$\gamma = S/(L \cdot N_m) \tag{1}$$

In the equation (1), S represents the moving speed (mm/min) of the burners, L represents the moving distance (mm) of the burners, and $N_m$ represents the lowest value (rpm) of the rotation number of the soot body, which is fluctuated.

That is, it has been revealed that, in the soot body, not only the deposition amount and density distribution in the axial direction, but also a local density distribution in the radial direction is generated, and the influence thereof causes various problems, such as a crack, a chlorine content con-centration distribution, and an OH group content concentra-tion distribution. Further, it has been found that, when the rotation peripheral speed of the soot body at the time of growth is controlled so as to be practically constant and the frequency factor γ is set so as to fall within a predetermined range, even a soot body having an outer diameter of more than 300 mm can be produced without significantly increas-ing a load on an apparatus, such as a centrifugal force generated during growth, crack occurrence is suppressed, and nonuniformity in each of chlorine content concentration and OH group content concentration can be suppressed. Further, it has been found that, when the above-mentioned settings are adopted, the target can be easily extracted from the soot body increased in diameter.

That is, according to at least one embodiment of the present invention, there is provided a method of manufac-turing a hollow porous quartz glass preform, including: arranging a plurality of burners for synthesizing glass fine particles at predetermined intervals and subjecting the burn-ers to reciprocating movement to deposit glass fine particles on a rotating target, to thereby grow a soot body; and extracting the target from the soot body, to thereby manu-facture a hollow porous quartz glass preform, wherein a rotation peripheral speed of the soot body is controlled so as to be practically constant by fluctuating a rotation number of the soot body on the basis of a fluctuating outer diameter of the soot body during growth, and wherein a frequency factor γ calculated by the following equation (1) is set so as to fall within a range of the following expression (2) in a range in which the outer diameter of the soot body is more than 250 mm.

$$\gamma = S/(L \cdot N_m) \tag{1}$$

$$0.13 \le \gamma < 1.0 \tag{2}$$

In the equation (1), S represents a moving speed (mm/min) of the burners, L represents a moving distance (mm) of the burners, and $N_m$ represents a lowest value (rpm) of the rotation number of the soot body, which is fluctuated.

In the case where the reciprocating movement of the burners is performed under a wobbling condition of moving turning positions in the reciprocating movement by prede-termined distances, when the movement amount of the turning positions in one to-and-fro cycle of the burners is ⅓ or less of the flame diameter of each of the burners applied to the soot body, the frequency factor γ is suitably set so as to fall within the range of the expression (2). In at least one embodiment of the present invention, the moving of the turning positions in the reciprocating movement of the burners by predetermined distances is referred to as "wob-bling". In the method according to at least one embodiment of the present invention, when the wobbling is performed under the above-mentioned conditions, there can be obtained a hollow porous quartz glass preform that is homogeneous with an extremely small density fluctuation amount. Under the wobbling condition, when the movement amount of the turning positions is more than ⅓ of the flame diameter, the turning positions are dispersed, and hence heat is also dispersed. Accordingly, the risk of causing a problem, such as a crack or nonuniformity in physical properties, is relatively low.

The frequency factor γ is suitably 0.13 or more and 0.3 or less. When the frequency factor γ is set to 0.3 or less, the soot body is free of any crack or rupture, and there can be obtained a hollow synthetic quartz glass cylinder having a uniform chlorine content concentration distribution and a uniform OH group content concentration distribution, thereby being extremely homogeneous optically and in terms of thermophysical properties.

According to at least one embodiment of the present invention, there is provided a method of manufacturing a synthetic quartz glass cylinder, including using a hollow porous quartz glass preform obtained by the method of manufacturing a hollow porous quartz glass preform accord-ing to at least one embodiment of the present invention.

A first aspect of the hollow porous quartz glass preform according to at least one embodiment of the present inven-tion is a large-sized hollow porous quartz glass preform of a cylindrical shape having an outer diameter of more than 300 mm and a length of 2 m or more, wherein the preform has an average density of 0.55 g/cm³ or more as a whole, wherein a density fluctuation amount per unit length among four points at equal distances from an inner surface in a radial direction in four directions at 90° intervals in a cylindrical cross-section is 10%/cm or less with respect to an average value of the four points, and wherein the preform is free of any crack.

A second aspect of the hollow porous quartz glass preform according to at least one embodiment of the present invention is a large-sized hollow porous quartz glass preform of a cylindrical shape having an outer diameter of 500 mm or more and a length of 1.0 m or more, wherein the preform has an average density of 0.55 g/cm$^3$ or more as a whole, wherein a density fluctuation amount per unit length among four points at equal distances from an inner surface in a radial direction in four directions at 90° intervals in a cylindrical cross-section is 10%/cm or less with respect to an average value of the four points, and wherein the preform is free of any crack.

The large-sized hollow porous quartz glass preform is suitably obtained by the above-mentioned method of manufacturing a hollow porous quartz glass preform.

A third aspect of the hollow porous quartz glass preform according to at least one embodiment of the present invention is a hollow porous quartz glass preform, which is obtained by the above-mentioned method of manufacturing a hollow porous quartz glass preform, and which is manufactured under the above-mentioned wobbling condition and under the condition that the movement amount of the turning position in one to-and-fro cycle of the burners is ⅓ or less of the flame diameter of each of the burners applied to the soot body, wherein a density fluctuation amount per unit length among four points at equal distances from an inner surface in a radial direction in four directions at 90° intervals in a cylindrical cross-section is 2%/cm or less with respect to an average value of the four points.

A first aspect of a hollow synthetic quartz glass cylinder according to at least one embodiment of the present invention is obtained by dehydrating and vitrifying the above-mentioned hollow porous quartz glass preform, has an outer diameter of from 200 mm to 500 mm, a length of from 0.7 m to 3.5 m, an OH group concentration of less than 5 ppm, and a chlorine content concentration of 500 ppm or more and 3,000 ppm or less, and is free of any appearance failure portion resulting from a crack of a porous member.

In the first aspect of the hollow synthetic quartz glass cylinder, a "maximum-minimum difference" of chlorine concentrations at four positions at 90° intervals in a peripheral direction at equal distances from an inner surface in a cylindrical cross-section of the hollow synthetic quartz glass cylinder is suitably within 15% with respect to an average value of the four positions.

A second aspect of the hollow synthetic quartz glass cylinder according to at least one embodiment of the present invention is obtained by pre-sintering and vitrifying the above-mentioned hollow porous quartz glass preform, has an outer diameter of from 200 mm to 500 mm, a length of from 0.7 m to 3.5 m, and an OH group concentration of 50 ppm or more and 500 ppm or less, and is free of any appearance failure portion resulting from a crack of a porous member.

In the second aspect of the hollow synthetic quartz glass cylinder, a "maximum-minimum difference" of OH group concentrations at four positions at 90° intervals in a peripheral direction at equal distances from an inner surface in a cylindrical cross-section of the hollow synthetic quartz glass cylinder is suitably within 15% with respect to an average value of the four positions.

A third aspect of the hollow synthetic quartz glass cylinder according to at least one embodiment of the present invention is a hollow synthetic quartz glass cylinder, which is obtained by vitrifying the third aspect of the hollow porous quartz glass preform, wherein a "maximum-minimum difference" of chlorine concentrations at four positions at 90° intervals in a peripheral direction at equal distances from an inner surface in a cylindrical cross-section of the hollow synthetic quartz glass cylinder is 10% or less with respect to an average value of the four positions.

A fourth aspect of the hollow synthetic quartz glass cylinder according to at least one embodiment of the present invention is a hollow synthetic quartz glass cylinder, which is obtained by vitrifying the third aspect of the hollow porous quartz glass preform, wherein a "maximum-minimum difference" of OH group concentrations at four positions at 90° intervals in a peripheral direction at equal distances from an inner surface in a cylindrical cross-section of the hollow synthetic quartz glass cylinder is 10% or less with respect to an average value of the four positions.

According to at least one embodiment of the present invention, the following significant effect is achieved: there can be provided such a large-sized hollow synthetic quartz glass porous preform and method of manufacturing the same, and hollow synthetic quartz glass cylinder and method of manufacturing the same, as described below: even a soot body having an outer diameter of more than 300 mm can be produced without significantly increasing a load on an apparatus, such as a centrifugal force generated during growth; the local density distribution of the soot body under constant-peripheral speed and low-rotation number conditions caused by an increase in diameter of the soot body to an outer diameter of more than 300 mm is eliminated; even when manufactured at low-speed rotation, the soot body is free of any crack or rupture; and the target can be easily extracted from the soot body increased in diameter.

Further, according to at least one embodiment of the present invention, there can be obtained a hollow large-sized synthetic quartz glass cylinder having a uniform chlorine content concentration or a uniform OH group content concentration, thereby having physical properties that are extremely homogeneous optically and in terms of thermo-physical properties.

DESCRIPTION OF THE EMBODIMENTS

Embodiments of the present invention are described below, but these embodiments are described as examples, and hence it is understood that various modifications may be made thereto without departing from the technical spirit of the present invention. In the illustrated examples, the same members are represented by the same reference symbols.

Figure 1:
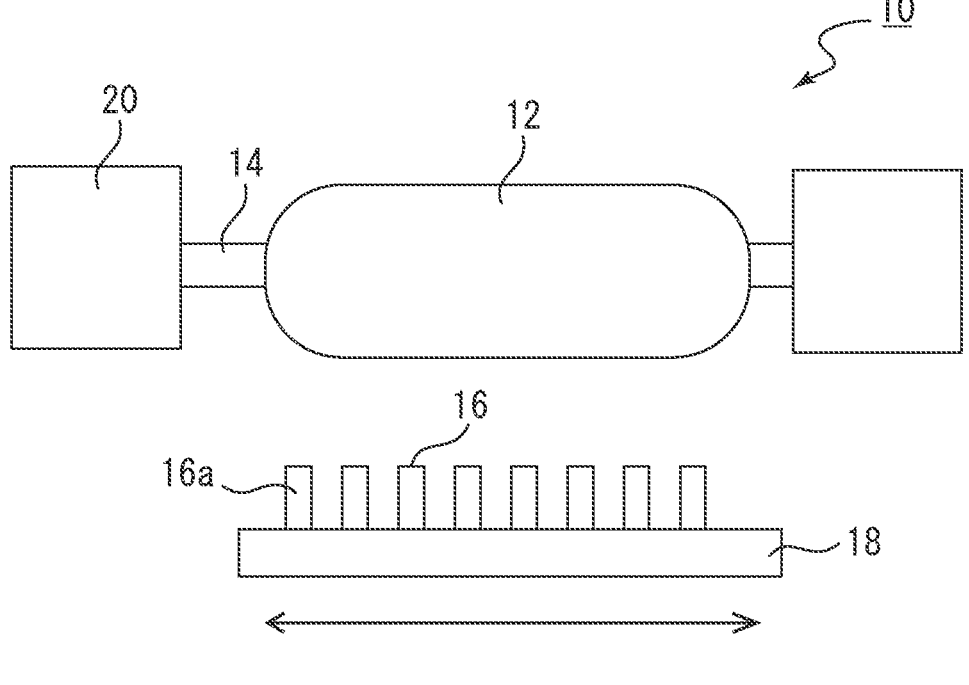
FIG. 1 is a schematic explanatory diagram for illustrating a method of manufacturing a hollow porous quartz glass preform according to at least one embodiment of the present invention.

FIG. 1 is a schematic explanatory diagram for illustrating a method of manufacturing a hollow porous quartz glass preform according to at least one embodiment of the present invention. The method of manufacturing a hollow porous quartz glass preform according to at least one embodiment of the present invention is a method of manufacturing a hollow porous quartz glass preform including arranging a plurality of burners 16a for synthesizing glass fine particles and subjecting the burners 16a to reciprocating movement to deposit glass fine particles on a rotating target 14, to thereby grow a soot body 12, wherein the rotation peripheral speed of the soot body 12 is controlled so as to be practically constant by fluctuating the rotation number of the soot body 12 on the basis of the fluctuating outer diameter of the soot body 12 during growth, and wherein a frequency factor $\gamma$ calculated by the following equation (1) is set so as to fall within the range of the following expression (2) in a range in which the outer diameter of the soot body is more than 250 mm. The term "practically constant" means±5%.

$$Y=S/(L \cdot N_m) \tag{1}$$

$$0.13 \leq \gamma < 1.0 \tag{2}$$

In the equation (1), S represents the moving speed (mm/min) of the burners 16a, L represents the moving distance (mm) of the burners 16a, and $N_m$ represents the lowest value (rpm) of the rotation number of the soot body 12, which is fluctuated.

In FIG. 1, reference numeral 10 denotes a manufacturing apparatus configured to manufacture a hollow porous quartz glass preform, and the manufacturing apparatus includes: a target holding and rotating mechanism 20 configured to rotate and hold the target 14, and to control its rotation speed (rpm); a burner group 16 for synthesizing glass fine particles, in which the plurality of burners 16a for synthesizing glass fine particles are arranged at predetermined intervals; and a burner group movement controller 18 configured to control the swing and up-and-down movement of the burner group 16.

As illustrated in FIG. 1, through use of the target holding and rotating mechanism 20, which is configured to control the rotation number of the target 14, and the burner group 16 for synthesizing glass fine particles, whose swing (reciprocating movement) and up-and-down movement are controlled by the burner group movement controller 18, the rotation peripheral speed of the soot body 12 is controlled so as to be practically constant by fluctuating the rotation number of the soot body 12 on the basis of the fluctuating outer diameter of the soot body 12 during growth, and the frequency factor $\gamma$ calculated by the equation (1) is set so as to be 0.13 or more and less than 1.0. Under such conditions, the soot body 12 is grown by depositing glass fine particles, which are produced through a hydrolysis reaction with the flames of the burners 16a for synthesizing glass fine particles supplied with a glass raw material (e.g., $SiCl_4$), on the outer surface of the rod-shaped target 14 having its rotation number controlled, and being rotated and held, by the target holding and rotating mechanism 20, and then the target 14 is extracted from the soot body 12. Thus, a hollow porous quartz glass preform according to at least one embodiment of the present invention may be manufactured.

Figure 5:
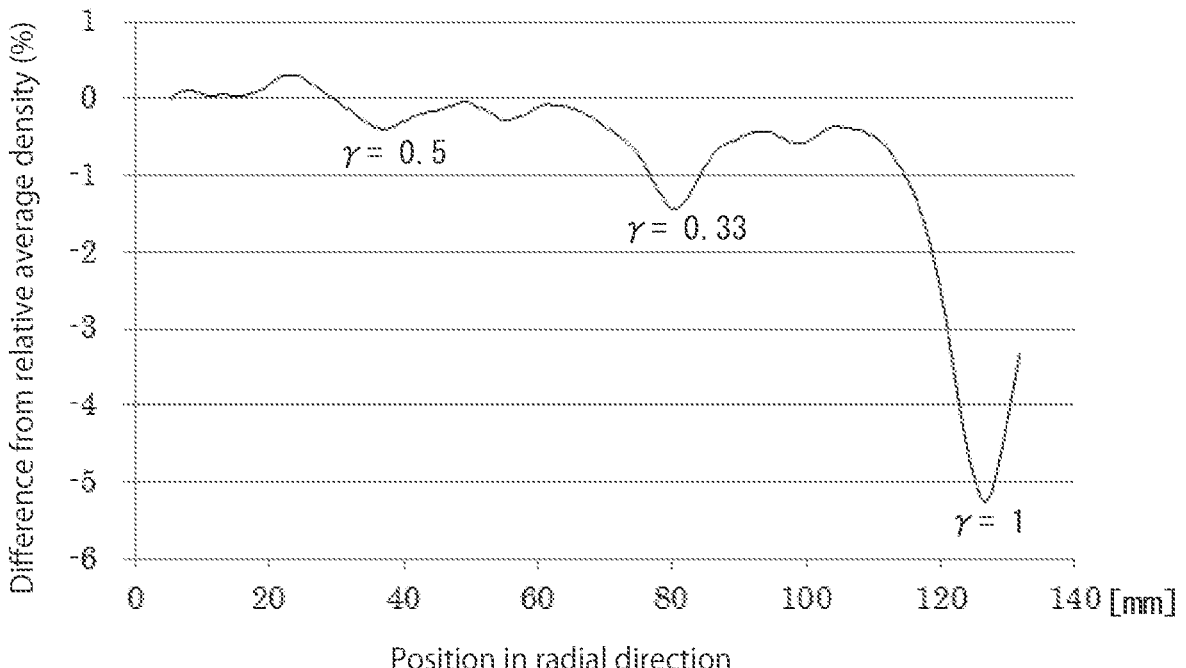
FIG. 5 is a graph for showing the density distribution of the soot body in its radial direction.

The occurrence of a crack is caused by a local density difference generated in the soot body, and the local density difference occurs as a result of a coincidence between the timing of one rotation of the soot body and the timing of turning of the swing of the burners. Now, a case in which Y rotations occur during X swings (X/2 to-and-fro cycles) is considered. A period of time required for X swings is X(L/S), while a period of time required for Y rotations is Y/N. Here, L represents the moving distance (mm) of the burners, S represents the moving speed (mm/min) of the burners, and N represents the rotation number (rpm) of the soot body. The coincidence between the timings of the swing and the rotation means X(L/S)=Y/N, i.e., X/Y=S/(LN). The X/Y is referred to as "frequency factor $\gamma$". The "$\gamma$" shown in FIG. 5 represents the frequency factor.

For example, when two rotations occur during two swings, $\gamma=X/Y=2/2=1$. In this case, at one rotation of turning, the timings of the rotation and the swing coincide with each other on the left-end side of the swing, and at the next one rotation, the timings coincide with each other on the right-end side. The plurality of burners are arranged at equal intervals, and hence the rotation and the swing coincide with each other at every rotation in consideration of an adjacent burner. The vicinity of a site at which the coincidence occurs attains a high density, whereas any other site attains an extremely low density. In addition, the large density difference results in the formation of a crack during growth or after completion of growth.

In at least one embodiment of the present invention, the surface peripheral speed of the soot body is controlled so as to be practically constant, and $\gamma$ is set to less than 1.0 in the range in which the outer diameter of the soot body is more than 250 mm. Consequently, a large-sized hollow porous quartz glass preform free of any crack or rupture can be obtained. In at least one embodiment of the present invention, the surface peripheral speed of the soot body is preferably from 5 m/min to 50 m/min, more preferably from 5 m/min to 10 m/min.

Further, by similar reasoning, also when the rotation and the turning coincide with each other not every time, but once every few times, the influence is exhibited. Table 1 shows the frequency at which the rotation and the swing coincide with each other in the case where swing number X=2 and rotation number Y is an even number, and Table 2 shows the frequency at which the rotation and the swing coincide with each other in the case where swing number X=2 and rotation number Y is an odd number.

TABLE 1

Frequency at which rotation and swing coincide with each other in the case where X = 2 and Y is even number.

| Swing number X | Rotation number Y | Y | | Frequency |
|---|---|---|---|---|
| 2 | 12 | | Once every 6 rotations | 17% |
| 2 | 10 | 0.20 | Once every 5 rotations | 20% |
| 2 | 8 | 0.25 | Once every 4 rotations | 25% |
| 2 | 6 | 0.33 | Once every 3 rotations | 33% |
| 2 | 4 | 0.50 | Once every 2 rotations | 50% |
| 2 | 2 | 1.00 | Once every 1 rotation | 100% |

TABLE 2

Frequency at which rotation and swing coincide with each other in the case where X = 2 and Y is odd number.

| Swing number X | Rotation number Y | Y | | Frequency |
|---|---|---|---|---|
| 2 | 9 | 0.22 | Once every 9 rotations | 11% |
| 2 | 7 | 0.29 | Once every 7 rotations | 14% |
| 2 | 5 | 0.40 | Once every 5 rotations | 20% |
| 2 | 3 | 0.67 | Once every 3 rotations | 33% |

When three rotations occur during two swings (one to-and-fro cycle), i.e., $\gamma=\frac{2}{3}=0.667$, the turning position of the swing and the position of one rotation of the rotation coincide with each other once every three rotations to generate a difference in density, though to a lesser degree than when the coincide with each other occurs every time. When four rotations occur during two swings (one to-and-fro cycle), i.e., $\gamma=\frac{2}{4}=0.5$, the turning position of the swing and the position of one rotation of the rotation coincide with each other twice every four rotations to generate a density difference. In those cases, the density difference is not as large as when the coincidence occurs every time, and hence is not liable to lead to the occurrence of a crack. However, the density difference causes nonuniformity in chlorine content concentration distribution and OH group content concentration distribution, and hence an optically homogeneous quartz glass cannot be obtained.

In view of the foregoing, in the frequency factor $\gamma$ represented by $X/Y=S/(LN)$, when the swing distance, the swing speed, and the rotation number are set so that the value of the frequency factor $\gamma$ satisfies $\gamma \le 0.3$ at a time when N is the lowest value $N_m$, conditions under which the timings of the rotation and the swing do not coincide with each other can be achieved. As a result, a quartz glass cylinder free of any crack and having a small chlorine content concentration distribution and a small OH group content concentration distribution can be obtained. In at least one embodiment of the present invention, the rotation peripheral speed of the soot body is controlled so as to be practically constant, and hence the rotation number of the soot body is reduced along with the growth of the soot body. Accordingly, in at least one embodiment of the present invention, the frequency factor $\gamma$ is defined as that at the time when the rotation number N is the lowest value $N_m$.

In addition, by virtue of setting the frequency factor $\gamma$ to 0.13 or more, even when deposition is performed until the outer diameter becomes more than 250 mm, the soot body can be manufactured without causing vibration of the soot body or vibration of the apparatus during growth.

In at least one embodiment of the present invention, the frequency factor $\gamma$ is 0.13 or more and less than 1.0, preferably 0.13 or more and 0.3 or less. When $\gamma$ is set to less than 1.0, the soot body is free of any crack or rupture. Further, when $\gamma$ is set to 0.3 or less, the soot body is free of any crack or rupture, and there can be obtained a quartz glass cylinder having a uniform chlorine content concentration distribution and a uniform OH group content concentration distribution, thereby being homogeneous optically and in terms of thermophysical properties.

Figures 2A, 2B:
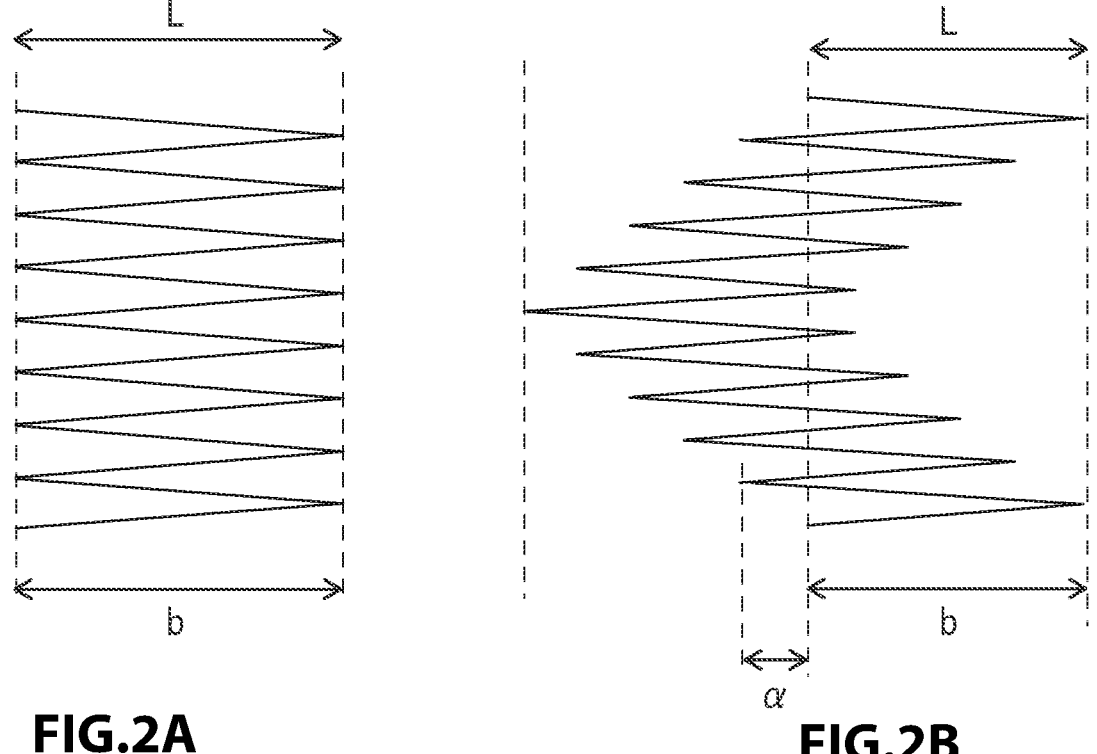
FIG. 2A is a schematic explanatory diagram for illustrating the movement of burners in the method of manufacturing a hollow porous quartz glass preform according to at least one embodiment of the present invention under a non-wobbling condition.
FIG. 2B is a schematic explanatory diagram for illustrating the movement of burners in the method of manufacturing a hollow porous quartz glass preform according to at least one embodiment of the present invention under a wobbling condition.

In the method according to at least one embodiment of the present invention, a so-called wobbling condition of moving the turning positions of the swing by predetermined distances ($\alpha$) in a certain direction so as to move the turning positions in an opposite direction at predetermined positions may be used, or a non-wobbling condition may be used. FIG. 2($a$) and FIG. 2($b$) are schematic explanatory diagrams for illustrating the movement of the burners in the method of manufacturing a hollow porous quartz glass preform according to at least one embodiment of the present invention under (a) the non-wobbling condition and under (b) the wobbling condition, respectively. In FIG. 2($a$) and FIG. 2($b$), L represents a swing distance, "b" represents a burner interval, and $\alpha$ represents a wobbling shift amount. In FIG. 2($a$) and FIG. 2($b$), cases under the conditions of a swing distance and a burner interval that are equal to each other are illustrated, but in the present invention, the swing distance and the burner interval may be equal to or different from each other.

In the case where the wobbling condition is adopted, when the movement amount $\alpha$ of the turning position in one to-and-fro cycle of the burners is $\frac{1}{3}$ or less of the flame diameter of each of the burners applied to the soot body, the frequency factor $\gamma$ is suitably set so as to fall within the range of the expression (2). In the method according to at least one embodiment of the present invention, when the wobbling is performed under the above-mentioned conditions, there can be obtained a hollow porous quartz glass preform that is homogeneous with an extremely small density fluctuation amount. Under the wobbling condition, when the movement amount of the turning positions is more than $\frac{1}{3}$ of the flame diameter, the turning positions are dispersed, and hence heat is also dispersed. Accordingly, the risk of causing a problem, such as a crack or nonuniform in physical properties, is relatively low.

Figure 3:
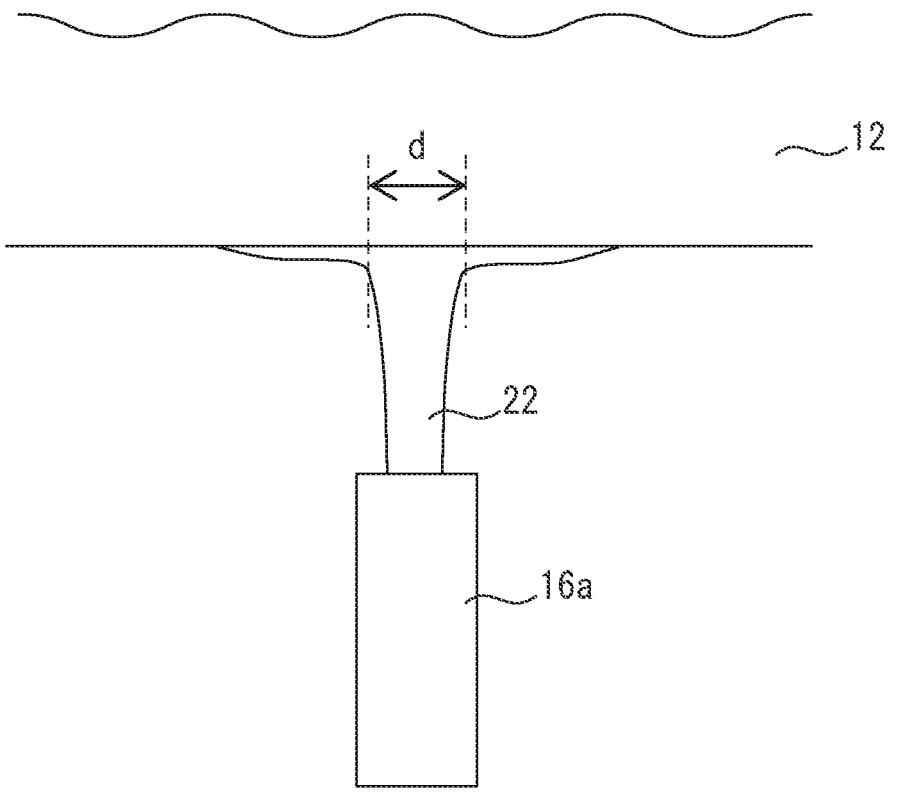
FIG. 3 is a schematic explanatory diagram for illustrating the application of a burner in the method of manufacturing a hollow porous quartz glass preform according to at least one embodiment of the present invention.
Figure 4:
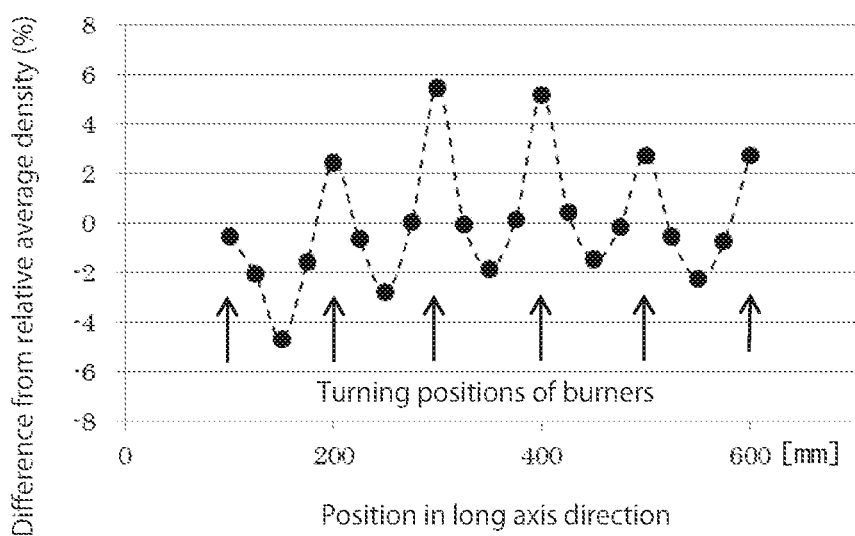
FIG. 4 is a graph for showing turning positions of reciprocating movement of burners and the density distribution of a deposited layer in the long axis direction of a soot body.

FIG. 3 is a schematic explanatory diagram for illustrating the application of a burner in the method of manufacturing a hollow porous quartz glass preform according to at least one embodiment of the present invention, and "d" represents the application diameter of a flame. Even in the case of using the wobbling, when the movement amount $\alpha$ of the turning position in each swing is $\frac{1}{3}$ or less of the application diameter "d" of the flame applied from the burner to a deposit and spread thereon, an overlap between layers is large, and hence the method according to at least one embodiment of the present invention is effective. The application diameter "d" of the flame may be measured by image analysis of the flame during the growth of the soot body.

According to the method according to at least one embodiment of the present invention, there can be obtained a large-sized hollow porous quartz glass preform having an outer diameter of more than 300 mm, which has its density fluctuation reduced and is free of any crack or rupture. Specifically, there can be obtained a large-sized hollow porous quartz glass preform of a cylindrical shape having an outer diameter of more than 300 mm and a length in its axial direction of 2 m or more, or a large-sized hollow porous quartz glass preform of a cylindrical shape having an outer diameter of 500 mm or more and a length in its axial direction of 1.0 m or more. In addition, according to the method according to at least one embodiment of the present invention, there can be obtained a large-weight and large-sized hollow porous quartz glass preform having a weight of 100 kg or more. Further, according to the method according to at least one embodiment of the present invention, the target can be extracted with extreme ease even when the soot body is increased in diameter and increased in weight.

A first aspect of a hollow porous quartz glass preform according to at least one embodiment of the present invention is a large-sized hollow porous quartz glass preform having an outer diameter of more than 300 mm and a length of 2 m or more, the preform having an average density of 0.55 g/cm³ or more as a whole, having its density fluctuation reduced, and being free of any crack.

A second aspect of a hollow porous quartz glass preform according to at least one embodiment of the present invention is a large-sized hollow porous quartz glass preform having an outer diameter of 500 mm or more and a length of 1.0 m or more, the preform having an average density of 0.55 g/cm³ or more as a whole, having its density fluctuation reduced, and being free of any crack.

In each of the first and second aspects of the hollow porous quartz glass preform, the average density of the preform as a whole is 0.55 g/cm³ or more, preferably 0.56 g/cm³ or more and 0.77 g/cm³ or less, more preferably 0.59 g/cm³ or more and 0.68 g/cm³ or less.

Figure 6:
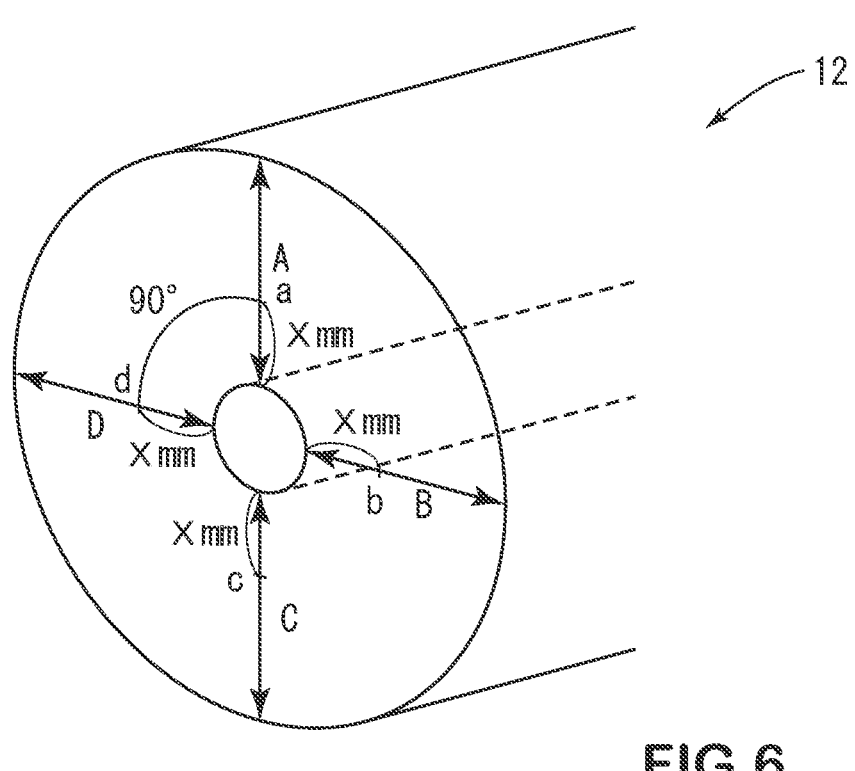
FIG. 6 is a schematic explanatory diagram for illustrating a measurement method for a density in a hollow porous quartz glass preform according to at least one embodiment of the present invention.

FIG. 6 is a schematic explanatory diagram for illustrating a measurement method for fluctuation in density in the hollow porous quartz glass preform according to at least one embodiment of the present invention. As illustrated in FIG. 6, a density per 1 cm³ at each of four points ("a" to "d") at equal distances (X mm) from an inner surface in a radial direction on perpendicular lines (A to D) in four directions at 90° intervals in a cylindrical cross-section of the hollow porous quartz glass preform 12 according to at least one embodiment of the present invention is measured, and the density fluctuation amount is defined as a difference between the maximum and the minimum of the densities at the four points ("a" to "d"). The density fluctuation amount per unit length of the hollow porous quartz glass preform 12 according to at least one embodiment of the present invention is 10%/cm or less, preferably 5%/cm or less, more preferably 2%/cm or less with respect to the average value of the four points ("a" to "d") in the four directions (A to D).

A third aspect of the hollow porous quartz glass preform according to at least one embodiment of the present invention is a hollow porous quartz glass preform in which a density fluctuation amount per unit length among four points at equal distances from an inner surface in a radial direction in four directions at 90° intervals in a cylindrical cross-section is 2%/cm or less with respect to the average value of the four points. In the above-mentioned method of manufacturing a hollow porous quartz glass preform, when the hollow porous quartz glass preform is manufactured under such a wobbling condition that the movement amount of the turning position in one to-and-fro cycle of the burners is ⅓ or less of the flame diameter of each of the burners applied to the soot body, the above-mentioned hollow porous quartz glass preform that is homogeneous with an extremely small density fluctuation amount of 2%/cm or less can be obtained.

A method of manufacturing a synthetic quartz glass cylinder according to at least one embodiment of the present invention includes using a hollow porous quartz glass preform obtained by the method according to at least one embodiment of the present invention. As the method of manufacturing a synthetic quartz glass cylinder, a synthetic quartz glass cylinder may be manufactured by a known method with the use of the hollow porous quartz glass preform, and the method is not particularly limited, but is suitably a method involving performing dehydrating treatment and sintering vitrification to provide a synthetic quartz glass cylinder, or a method involving performing pre-sintering and vitrification to provide a synthetic quartz glass cylinder. According to the method according to at least one embodiment of the present invention, a large-sized synthetic quartz glass cylinder having an outer diameter of 200 mm or more, which is free of any appearance failure portion resulting from a crack of a porous member and free of any crack or rupture, is suitably obtained.

As the large-sized synthetic quartz glass cylinder, specifically, a hollow synthetic quartz glass cylinder having an outer diameter of 200 mm or more can be obtained by using a large-sized hollow porous quartz glass preform of a cylindrical shape having an outer diameter of more than 300 mm, or a hollow synthetic quartz glass cylinder having an outer diameter of 300 mm or more can be obtained by using a large-sized hollow porous quartz glass preform of a cylindrical shape having an outer diameter of 500 mm or more. In particular, a hollow synthetic quartz glass cylinder having an outer diameter of 200 mm or more and less than 300 mm and a length in its axial direction of 2.3 mm or more, or a hollow synthetic quartz glass cylinder having an outer diameter of 300 mm or more and a length in its axial direction of 0.7 mm or more is more suitable.

In at least one embodiment of the present invention, through use of the hollow porous quartz glass preform obtained under the condition that the γ is set to less than 1.0 in the range in which the outer diameter of the soot body is more than 250 mm, there can be easily obtained a large-sized quartz glass cylinder free of any appearance failure portion resulting from a crack of a porous member and free of any crack or rupture. The quartz glass cylinder is particularly suitably as a material for a semiconductor manufacturing jig that is desired to have a large size. Further, through use of the hollow porous quartz glass preform obtained under the condition that the γ is set to 0.3 or less, there can be easily obtained a quartz glass cylinder that is free of any crack or rupture, and that has a uniform chlorine content concentration distribution and a uniform OH group content concentration distribution, thereby being extremely homogeneous optically and in terms of thermophysical properties.

A first aspect of a hollow synthetic quartz glass cylinder according to at least one embodiment of the present invention is a hollow synthetic quartz glass cylinder obtained by subjecting the above-mentioned large-sized hollow porous quartz glass preform to dehydration by chlorine treatment and to vitrification, the hollow synthetic quartz glass cylinder having an outer diameter of from 200 mm to 500 mm and a length of from 0.7 m to 3.5 m, having an OH group concentration of less than 5 ppm, a chlorine content concentration of 500 ppm or more and 3,000 ppm or less, preferably 1,000 ppm or more and 2,500 ppm or less, and being free of any appearance failure portion resulting from a crack of a porous member.

In the first aspect of the hollow synthetic quartz glass cylinder, the "maximum-minimum difference" of chlorine concentrations at four positions at 90° intervals in a peripheral direction at equal distances from an inner surface in a cylindrical cross-section of the hollow synthetic quartz glass cylinder is preferably within 15%, more preferably within 10% with respect to the average value of the four positions.

A second aspect of the synthetic quartz glass cylinder according to at least one embodiment of the present invention is a hollow synthetic quartz glass cylinder obtained by subjecting the above-mentioned large-sized hollow porous quartz glass preform to pre-sintering and vitrification without chlorine treatment, the hollow synthetic quartz glass cylinder having an outer diameter of from 200 mm to 500 mm and a length of from 0.7 m to 3.5 m, having an OH group concentration of 50 ppm or more and 500 ppm or less, preferably 100 ppm or more and 300 ppm or less, and being free of any appearance failure portion resulting from a crack of a porous member.

In the second aspect of the hollow synthetic quartz glass cylinder, the "maximum-minimum difference" of OH group concentrations at four positions at 90° intervals in a peripheral direction at equal distances from an inner surface in a cylindrical cross-section of the hollow synthetic quartz glass cylinder is preferably within 15%, more preferably within 10% with respect to the average value of the four positions.

A third aspect of the synthetic quartz glass cylinder according to at least one embodiment of the present invention is a hollow synthetic quartz glass cylinder obtained by vitrifying the third aspect of the hollow porous quartz glass preform, wherein the "maximum-minimum difference" of chlorine concentrations at four positions at 90° intervals in a peripheral direction at equal distances from an inner surface in a cylindrical cross-section of the hollow synthetic quartz glass cylinder is 10% or less with respect to the average value of the four positions. The OH group concentration of the synthetic quartz glass cylinder is preferably less than 5 ppm, and it is more preferred that the synthetic quartz glass cylinder be substantially free of any OH group. The phrase "substantially free of any OH group" means that the content of the OH group in the synthetic quartz glass cylinder is 0 ppm or more and less than 1 ppm.

A method of vitrifying the hollow porous quartz glass preform is not particularly limited, and a known method may be used. The method is suitably a method involving performing dehydrating treatment and sintering vitrification to provide a synthetic quartz glass cylinder, more suitably a method involving performing dehydrating treatment under a chlorine atmosphere, followed by sintering vitrification to provide a synthetic quartz glass cylinder.

A fourth aspect of the synthetic quartz glass cylinder according to at least one embodiment of the present invention is a hollow synthetic quartz glass cylinder obtained by vitrifying the third aspect of the hollow porous quartz glass preform, wherein the "maximum-minimum difference" of OH group concentrations at four positions at 90° intervals in a peripheral direction at equal distances from an inner surface in a cylindrical cross-section of the hollow synthetic quartz glass cylinder is 10% or less with respect to the average value of the four positions. It is preferred that the synthetic quartz glass cylinder be substantially free of chlorine. The phrase "substantially free of chlorine" means that the content of chlorine in the synthetic quartz glass cylinder is 0 ppm or more and less than 20 ppm.

A method of vitrifying the hollow porous quartz glass preform is not particularly limited, and a known method may be used. The method is suitably a method involving performing dehydrating treatment and sintering vitrification to provide a synthetic quartz glass cylinder, or a method involving performing pre-sintering and vitrification to provide a synthetic quartz glass cylinder, more suitably a method involving performing dehydrating treatment by heating without chlorine treatment, followed by sintering vitrification to provide a synthetic quartz glass cylinder.

Hitherto, in the case of adopting an increased size and adopting a low-rotation condition to make the peripheral speed constant during the growth of the soot body, there has been a problem in that: when dehydrating treatment is performed under a chlorine atmosphere in the manufacturing of a synthetic quartz glass cylinder, the chlorine content concentration distribution of the synthetic quartz glass cylinder in its peripheral direction becomes nonuniform; and when dehydration is performed by heating without chlorine treatment, the OH group content concentration distribution of the synthetic quartz glass cylinder in its peripheral direction becomes nonuniform. However, in the method according to at least one embodiment of the present invention, through use of the hollow porous quartz glass preform obtained under the condition that the $\gamma$ is set to 0.3 or less, there can be obtained an extremely homogeneous synthetic quartz glass cylinder that has a small chlorine content concentration distribution even when subjected to dehydrating treatment under a chlorine atmosphere, and that has a small difference in OH group content concentration distribution even when dehydrated by heating without chlorine treatment.

Such extremely homogeneous synthetic quartz glass cylinder is particularly suitable as an optical material, a material for an optical fiber, and a raw material for a material for a quartz glass jig or lamp to be used in a semiconductor manufacturing apparatus. In particular, it has been found that, when the difference between the maximum and the minimum of chlorine concentration distribution among respective points in four directions in the peripheral direction in a cross-section of the cylinder is within 15% with respect to the average value of the four points, the characteristics of an optical fiber, such as a fiber curl, are not affected.

In the chlorine content concentration distribution of the synthetic quartz glass cylinder subjected to dehydrating treatment under a chlorine atmosphere and made transparent by sintering, the difference between the highest concentration and the lowest concentration in four directions in the peripheral direction of the cylinder is preferably 300 ppm or less, more preferably 200 ppm or less.

In the OH group content concentration distribution of the synthetic quartz glass cylinder dehydrated by heating without chlorine treatment, the difference between the highest concentration and the lowest concentration of the OH group content concentrations in four directions in the peripheral direction of the cylinder is preferably 50 ppm or less, more preferably 25 ppm or less.

EXAMPLES

Example 1

In the so-called OVD method involving arranging a plurality of burners for synthesizing glass fine particles at constant intervals and subjecting the row of the burners to reciprocating movement (swing) relative to a rotating target [ceramics tube having an outer diameter (OD) of 50 mm] to deposit glass fine particles on the target in the form of a layer, to thereby manufacture a glass fine particle deposit, a soot body was manufactured under the conditions of a burner interval of 100 mm, a swing distance L of 100 mm, a swing speed S of 140 mm/min (constant), and a surface peripheral speed of 11 m/min (constant), and the target was extracted from the soot body to provide a hollow porous quartz glass preform. Manufacturing conditions are shown in Table 3, results for the resultant hollow porous quartz glass preform are shown in Table 4, and measurement results for synthetic quartz glass cylinders are shown in Tables 5 and 6.

TABLE 3

| | | | | Frequency factor γ | | | Soot body | |
|---|---|---|---|---|---|---|---|---|
| | Swing distance L [mm] | Swing speed S [mm/min] | Surface peripheral speed [m/min] | At OD 250 | At Final OD | Final OD [mm] | Length in axial direction [mm] | Presence or absence of wobbling |
| Example 1 | 100 | 140 | 11 | 0.13 | 0.16 | 400 | 3,500 | Absent |
| Example 2 | 100 | 200 | 9 | 0.22 | 0.28 | 400 | 3,500 | Absent |
| Example 3 | 100 | 600 | 9 | 0.66 | 0.84 | 400 | 3,500 | Absent |
| Example 4 | 100 | 200 | 9 | 0.22 | 0.28 | 400 | 3,500 | Present |
| Example 5 | 100 | 200 | 13 | 0.23 | 0.29 | 600 | 2,500 | Absent |
| Example 6 | 100 | 400 | 9 | 0.66 | 0.84 | 600 | 2,500 | Absent |
| Example 7 | 100 | 200 | 13 | 0.23 | 0.29 | 600 | 2,500 | Present |
| Comparative Example 1 | 100 | 140 | 18 | 0.08 | — | — | 3,500 | Absent |
| Comparative Example 2 | 100 | 800 | 9 | 0.88 | — | — | 3,500 | Absent |
| Comparative Example 3 | 100 | 800 | 9 | 0.88 | — | — | 3,500 | Present |

*Manufacturing Conditions*

When the soot body is grown to an outer diameter (OD) of 400 mm from a target OD of 50 mm, under the above-mentioned conditions, the rotation number is decreased from 70.1 rpm to 8.8 rpm. In that case, the lowest rotation number $N_m$ is 8.8 rpm, and hence $\gamma=S/(L\cdot N_m)=0.16$.

As a result, with regard to vibration and the like of an apparatus during the growth, although there was slight vibration, the growth was able to be performed without any problem, and there was no crack in the soot body. Thus, a large-sized hollow porous quartz glass preform (soot body) having an outer diameter of 400 mm, an overall length in its axial direction of 3,500 mm, and a weight of 247 kg was able to be produced.

The average density of the resultant soot body as a whole and fluctuation in density thereof were measured. For the fluctuation in density, densities per unit length at four points ("a" to "d") at X=105 mm in FIG. 6 were calculated, the difference between the maximum and the minimum of the densities at the four points ("a" to "d") was defined as a density fluctuation amount, and the ratio thereof to the average value of the four points was calculated.

TABLE 4

*Results for Hollow Porous Quartz Glass Preform (Soot Body)*

| | Vibration of apparatus | Presence or absence of crack | Average density of whole [g/cm³] | Density fluctuation amount among four directions [%/cm] |
|---|---|---|---|---|
| Example 1 | Slight | Absent | 0.57 | 4.4 |
| Example 2 | Absent | Absent | 0.57 | 3.8 |
| Example 3 | Absent | Absent | 0.57 | 9.5 |
| Example 4 | Absent | Absent | 0.57 | 1.6 |
| Example 5 | Absent | Absent | 0.57 | 3.7 |
| Example 6 | Absent | Absent | 0.57 | 8.3 |
| Example 7 | Absent | Absent | 0.57 | 1.8 |
| Comparative Example 1 | Large | — | — | — |
| Comparative Example 2 | Absent | Present | — | — |
| Comparative Example 3 | Absent | Present | — | — |

The average density of the soot body as a whole was 0.57 g/cm³, and the density fluctuation amount per unit length among four points at positions of 105 mm from the inner surface in four directions was 4.4%/cm with respect to the average value of the four points, that is, a hollow porous quartz glass preform having an extremely small density fluctuation amount was obtained.

The resultant hollow porous quartz glass preform was subjected to dehydrating treatment under a chlorine atmosphere and made transparent by sintering to provide a synthetic quartz glass cylinder having an outer diameter of 210 mm, an inner diameter of 45 mm or less, and a length of 3.4 m. The resultant synthetic quartz glass cylinder was free of any appearance failure portion resulting from a crack of a porous member, and hence had a satisfactory appearance.

The chlorine concentration and OH group concentration of the resultant quartz glass cylinder were measured. The chlorine content concentration was measured in each of four directions by X-ray fluorescence analysis. As an analyzer for measuring the chlorine concentration, an X-ray fluorescence analyzer SPECTRO MIDEX manufactured by SPECTRO was used (lower detection limit value of the analyzer: a chlorine concentration of 20 ppm). The OH group content concentration (OH group) was measured by FT-IR analysis. As an analyzer for measuring the OH group content concentration, a Fourier-transform infrared spectrometer Nicolet iS10 FT-IR manufactured by Thermo Fisher Scientific was used (lower detection limit value of the spectrometer: an OH group concentration of 1 ppm). With regard to fluctuation in chlorine concentration, the difference between the maximum and the minimum of chlorine concentrations at four positions at 90° intervals 50 mm away from the inner surface in a cylindrical cross-section in the peripheral direction was measured, and the ratio thereof to the average value of the four points was calculated. The results are shown in Table 5.

TABLE 5

| | | | | | Chlorine content concentration | | | | | |
| | OD [mm] | Length in axial direction [mm] | OH group concentration [ppm] | Direction A [ppm] | Direction B [ppm] | Direction C [ppm] | Direction D [ppm] | Max-Min of four direction [ppm] | Average value of four directions [ppm] | Fluctuation amount [%] |
|---|---|---|---|---|---|---|---|---|---|---|
| Example 1 | 210 | 3,400 | Less than 1 | 1,540 | 1,720 | 1,705 | 1,660 | 180 | 1,656 | 10.9 |
| Example 2 | 210 | 3,400 | Less than 1 | 1,740 | 1,960 | 1,860 | 1,960 | 220 | 1,880 | 11.7 |
| Example 3 | 210 | 3,400 | Less than 1 | 1,640 | 1,780 | 2,330 | 2,160 | 690 | 1,978 | 34.9 |
| Example 4 | 210 | 3,400 | Less than 1 | 1,980 | 1,975 | 1,995 | 1,860 | 135 | 1,953 | 6.9 |
| Example 5 | 350 | 1,930 | Less than 1 | 1,950 | 1,935 | 1,890 | 2,170 | 280 | 1,986 | 14.1 |
| Example 6 | 350 | 1,930 | Less than 1 | 2,240 | 2,160 | 1,725 | 2,340 | 615 | 2,116 | 29.1 |
| Example 7 | 350 | 1,930 | Less than 1 | 1,880 | 1,935 | 1,770 | 1,920 | 165 | 1,876 | 8.8 |
| Comparative Example 1 | — | — | — | — | — | — | — | — | — | — |
| Comparative Example 2 | — | — | — | — | — | — | — | — | — | — |
| Comparative Example 3 | — | — | — | — | — | — | — | — | — | — |

The results of the measurement of the chlorine content concentrations in four directions in the peripheral direction of the cylinder revealed that the chlorine content concentrations were from 1,540 ppm to 1,720 ppm. The maximum difference between the four directions was as small as 180 ppm, and the fluctuation amount with respect to the average value of the four directions was 10.9%, that is, a homogeneous product was obtained. In addition, the OH group content concentration (OH group) was less than 1 ppm.

Further, a soot body produced under the same conditions was dehydrated by heating without chlorine treatment, and was then made transparent by sintering to provide a synthetic quartz glass cylinder having an outer diameter of 210 mm, an inner diameter of 45 mm or less, and a length of 3.4 m. The resultant synthetic quartz glass cylinder was free of any appearance failure portion resulting from a crack of a porous member, and hence had a satisfactory appearance.

The chlorine concentration and OH group concentration of the resultant quartz glass cylinder were measured. With regard to fluctuation in OH group concentration, the difference between the maximum and the minimum of OH group concentrations at four positions at 90° intervals 50 mm away from the inner surface in a cylindrical cross-section in the peripheral direction was measured, and the ratio thereof to the average value of the four points was calculated. The results are shown in Table 6.

TABLE 6

| | | | | | OH group content concentration | | | | | |
| | OD [mm] | Length in axial direction [mm] | Direction A [ppm] | Direction B [ppm] | Direction C [ppm] | Direction D [ppm] | Max-Min of four directions [ppm] | Average value of four directions [ppm] | Fluctuation amount [%] |
|---|---|---|---|---|---|---|---|---|---|---|
| Example 1 | 210 | 3,400 | 230 | 250 | 255 | 245 | 25 | 245 | 10.2 |
| Example 2 | 210 | 3,400 | 250 | 240 | 225 | 255 | 30 | 243 | 12.4 |
| Example 3 | 210 | 3,400 | 195 | 230 | 255 | 220 | 60 | 225 | 26.7 |
| Example 4 | 210 | 3,400 | 215 | 200 | 210 | 215 | 15 | 210 | 7.1 |
| Example 5 | 350 | 1,930 | 225 | 245 | 250 | 230 | 25 | 238 | 10.5 |
| Example 6 | 350 | 1,930 | 245 | 200 | 250 | 225 | 50 | 230 | 21.7 |
| Example 7 | 350 | 1,930 | 205 | 225 | 215 | 205 | 20 | 213 | 9.4 |
| Comparative Example 1 | — | — | — | — | — | — | — | — | — |
| Comparative Example 2 | — | — | — | — | — | — | — | — | — |
| Comparative Example 3 | — | — | — | — | — | — | — | — | — |

The measurement of the OH group content concentrations in four directions in the peripheral direction of the cylinder revealed that the OH group content concentrations were from 230 ppm to 255 ppm. Thus, it was found that, also in this case, the maximum difference between the four directions was as small as 25 ppm, and the fluctuation amount with respect to the average value of the four directions was 10.2%, indicating homogeneity. In addition, the chlorine content concentration was less than 20 ppm.

Example 2

A hollow porous quartz glass preform was obtained by the same method as that of Example 1 except that the manufacturing conditions were changed as shown in Table 3. That is, a soot body was manufactured under the conditions of a burner interval of 100 mm, a swing distance L of 100 mm, a swing speed S of 200 mm/min (constant), and a surface peripheral speed of 9 m/min (constant), and the target was extracted from the soot body to provide a hollow porous quartz glass preform. Results for the resultant hollow porous quartz glass preform are shown in Table 4, and measurement results for synthetic quartz glass cylinders are shown in Tables 5 and 6.

When the soot body is grown to an OD of 400 mm from a target OD of 50 mm, under the above-mentioned conditions, the rotation number is decreased from 57.3 rpm to 7.2 rpm. In that case, the lowest rotation number $N_m$ is 7.2 rpm, and hence $\gamma=0.28$.

As a result, the growth was able to be performed without vibration or the like of the apparatus during the growth, and there was no crack in the soot body. Thus, a large-sized hollow porous quartz glass preform having an outer diameter of 400 mm, an overall length of 3,500 mm, and a weight of 247 kg was able to be produced.

The average density of the resultant soot body as a whole and fluctuation in density thereof were measured. For the fluctuation in density, densities per unit length at four points at X=105 mm in FIG. 6 were calculated. The average density of the soot body as a whole was 0.57 g/cm$^3$, and the density fluctuation per unit length among positions of 105 mm from the inner surface in four directions was 3.8%/cm with respect to the average value of the four points, that is, a hollow porous quartz glass preform having an extremely small density fluctuation amount was obtained.

The resultant hollow porous quartz glass preform was subjected to dehydrating treatment under a chlorine atmosphere and made transparent by sintering to provide a synthetic quartz glass cylinder having an outer diameter of 210 mm, an inner diameter of 45 mm or less, and a length of 3.4 m. The resultant synthetic quartz glass cylinder was free of any appearance failure portion resulting from a crack of a porous member, and hence had a satisfactory appearance.

The chlorine concentration and OH group concentration of the resultant quartz glass cylinder were measured. With regard to fluctuation in chlorine concentration, the difference between the maximum and the minimum of chlorine concentrations at four positions at 90° intervals 50 mm away from the inner surface in a cylindrical cross-section in the peripheral direction was measured, and the ratio thereof to the average value of the four points was calculated.

The results of the measurement of the chlorine content concentrations in four directions in the peripheral direction of the cylinder revealed that the chlorine content concentrations were from 1,740 ppm to 1,960 ppm. The maximum difference between the four directions was as small as 220 ppm, and the fluctuation amount with respect to the average value of the four directions was 11.7%, that is, a homogeneous product was obtained. In addition, the OH group content concentration (OH group) was less than 1 ppm.

Further, a soot body produced under the same conditions was dehydrated by heating without chlorine treatment, and was then made transparent by sintering to provide a synthetic quartz glass cylinder having an outer diameter of 210 mm, an inner diameter of 45 mm or less, and a length of 3.4 m. The resultant synthetic quartz glass cylinder was free of any appearance failure portion resulting from a crack of a porous member, and hence had a satisfactory appearance.

The chlorine concentration and OH group concentration of the resultant quartz glass cylinder were measured. With regard to fluctuation in OH group concentration, the difference between the maximum and the minimum of OH group concentrations at four positions at 90° intervals 50 mm away from the inner surface in a cylindrical cross-section in the peripheral direction was measured, and the ratio thereof to the average value of the four points was calculated.

The measurement of the OH group content concentrations in four directions in the peripheral direction of the cylinder revealed that the OH group content concentrations were from 225 ppm to 255 ppm. Thus, it was found that, also in this case, the maximum difference between the four directions was as small as 30 ppm, and the fluctuation amount with respect to the average value of the four directions was 12.4%, indicating homogeneity. In addition, the chlorine content concentration was less than 20 ppm.

Example 3

A hollow porous quartz glass preform was obtained by the same method as that of Example 1 except that the manufacturing conditions were changed as shown in Table 3. That is, a soot body was manufactured under the conditions of a burner interval of 100 mm, a swing distance L of 100 mm, a swing speed S of 600 mm/min (constant), and a surface peripheral speed of 9 m/min (constant), and the target was extracted from the soot body to provide a hollow porous quartz glass preform. Results for the resultant hollow porous quartz glass preform are shown in Table 4, and measurement results for a synthetic quartz glass cylinder are shown in Table 5.

When the soot body is grown to an OD of 400 mm from a target OD of 50 mm, under the above-mentioned conditions, the rotation number is decreased from 57.3 rpm to 7.2 rpm. In that case, the lowest rotation number $N_m$ is 7.2 rpm, and hence $\gamma=0.84$.

As a result, the growth was able to be performed without vibration or the like of the apparatus during the growth, and there was no crack in the soot body. Thus, a large-sized hollow porous quartz glass preform having an outer diameter of 400 mm, an overall length of 3,500 mm, and a weight of 247 kg was able to be produced.

The average density of the resultant soot body as a whole and fluctuation in density thereof were measured. For the fluctuation in density, densities per unit length at four points at X=105 mm in FIG. 6 were calculated. The average density of the soot body as a whole was 0.57 g/cm$^3$, and the density fluctuation per unit length among positions of 105 mm from the inner surface in four directions was 9.5%/cm with respect to the average value of the four points.

The resultant hollow porous quartz glass preform was subjected to dehydrating treatment under a chlorine atmosphere and made transparent by sintering to provide a synthetic quartz glass cylinder having an outer diameter of 210 mm, an inner diameter of 45 mm or less, and a length of 3.4 m. The resultant synthetic quartz glass cylinder was free of any appearance failure portion resulting from a crack of a porous member, and hence had a satisfactory appearance.

The chlorine concentration and OH group concentration of the resultant quartz glass cylinder were measured. With regard to fluctuation in chlorine concentration, the difference between the maximum and the minimum of chlorine concentrations at four positions at 90° intervals 50 mm away from the inner surface in a cylindrical cross-section in the peripheral direction was measured, and the ratio thereof to the average value was calculated.

The results of the measurement of the chlorine content concentrations in four directions in the peripheral direction of the cylinder revealed that the chlorine content concentrations were from 1,640 ppm to 2,330 ppm. The maximum difference between the four directions was as large as 690 ppm, and the fluctuation amount with respect to the average value of the four directions was 34.9%, that is, homogeneity was lowered as compared to that of each of Examples 1 and 2. In addition, the OH group content concentration (OH group) was less than 1 ppm.

Further, a soot body produced under the same conditions was dehydrated by heating without chlorine treatment, and was then made transparent by sintering to provide a synthetic quartz glass cylinder having an outer diameter of 210 mm, an inner diameter of 45 mm or less, and a length of 3.4 m. The resultant synthetic quartz glass cylinder was free of any appearance failure portion resulting from a crack of a porous member, and hence had a satisfactory appearance.

The chlorine concentration and OH group concentration of the resultant quartz glass cylinder were measured. With regard to fluctuation in OH group concentration, the difference between the maximum and the minimum of OH group concentrations at four positions at 90° intervals 50 mm away from the inner surface in a cylindrical cross-section in the peripheral direction was measured, and the ratio thereof to the average value was calculated.

The measurement of the OH group content concentrations in four directions in the peripheral direction of the cylinder revealed that the OH group content concentrations were from 195 ppm to 255 ppm. Thus, it was found that, also in this case, the maximum difference between the four directions was as large as 60 ppm, and the fluctuation amount with respect to the average value of the four directions was 26.7%, that is, homogeneity was lowered as compared to that of each of Examples 1 and 2. In addition, the chlorine content concentration was less than 20 ppm.

Example 4

A hollow porous quartz glass preform was obtained by the same method as that of Example 1 except that the manufacturing conditions were changed as shown in Table 3. That is, a soot body was manufactured under the conditions of a burner interval of 100 mm, a swing distance L of 100 mm, a swing speed S of 200 mm/min (constant), and a surface peripheral speed of 9 m/min (constant), and under the condition of a wobbling shift amount $\alpha$ of 4 mm per swing (In this case, the application diameter of a flame was 28 mm, and hence the wobbling shift amount was $\frac{1}{7}$ of the application diameter of the flame. A measurement method for the flame diameter was image analysis of the flame during the growth of the soot body), and the target was extracted from the soot body to provide a hollow porous quartz glass preform. Results for the resultant hollow porous quartz glass preform are shown in Table 4, and measurement results for a synthetic quartz glass cylinder are shown in Table 5.

When the soot body is grown to an OD of 400 mm from a target OD of 50 mm, under the above-mentioned conditions, the rotation number is decreased from 57.3 rpm to 7.2 rpm. In that case, the lowest rotation number $N_m$ is 7.2 rpm, and hence $\gamma=0.28$.

As a result, the growth was able to be performed without vibration or the like of the apparatus during the growth, and there was no crack in the soot body. Thus, a large-sized hollow porous quartz glass preform having an outer diameter of 400 mm, an overall length of 3,500 mm, and a weight of 247 kg was able to be produced.

The average density of the resultant soot body as a whole and fluctuation in density thereof were measured. For the fluctuation in density, densities per unit length at four points at X=105 mm in FIG. 6 were calculated. The average density of the soot body as a whole was 0.57 g/cm$^3$, and the density fluctuation per unit length among positions of 105 mm from the inner surface in four directions was 1.6%/cm with respect to the average value of the four points, that is, a hollow porous quartz glass preform having an extremely small density fluctuation amount was obtained.

The resultant hollow porous quartz glass preform was subjected to dehydrating treatment under a chlorine atmosphere and made transparent by sintering to provide a synthetic quartz glass cylinder having an outer diameter of 210 mm, an inner diameter of 45 mm or less, and a length of 3.4 m. The resultant synthetic quartz glass cylinder was free of any appearance failure portion resulting from a crack of a porous member, and hence had a satisfactory appearance.

The chlorine concentration and OH group concentration of the resultant quartz glass cylinder were measured. With regard to fluctuation in chlorine concentration, the difference between the maximum and the minimum of chlorine concentrations at four positions at 90° intervals 50 mm away from the inner surface in a cylindrical cross-section in the peripheral direction was measured, and the ratio thereof to the average value of the four points was calculated.

The results of the measurement of the chlorine content concentrations in four directions in the peripheral direction of the cylinder revealed that the chlorine content concentrations were from 1,860 ppm to 1,995 ppm. The maximum difference between the four directions was as extremely small as 135 ppm, and the fluctuation amount with respect to the average value of the four directions was 6.9%, that is, a homogeneous product was obtained. In addition, the OH group content concentration (OH group) was less than 1 ppm.

Further, a soot body produced under the same conditions was dehydrated by heating without chlorine treatment, and was then made transparent by sintering to provide a synthetic quartz glass cylinder having an outer diameter of 210 mm, an inner diameter of 45 mm or less, and a length of 3.4 m. The resultant synthetic quartz glass cylinder was free of any appearance failure portion resulting from a crack of a porous member, and hence had a satisfactory appearance.

The chlorine concentration and OH group concentration of the resultant quartz glass cylinder were measured. With regard to fluctuation in OH group concentration, the difference between the maximum and the minimum of OH group concentrations at four positions at 90° intervals 50 mm away from the inner surface in a cylindrical cross-section in the peripheral direction was measured, and the ratio thereof to the average value of the four points was calculated.

The measurement of the OH group content concentrations in four directions in the peripheral direction of the cylinder revealed that the OH group content concentrations were from 200 ppm to 215 ppm. Thus, it was found that, also in this case, the maximum difference between the four directions was as small as 15 ppm, and the fluctuation amount with respect to the average value of the four directions was 7.1%, indicating homogeneity. In addition, the chlorine content concentration was less than 20 ppm.

Example 5

A hollow porous quartz glass preform was obtained by the same method as that of Example 1 except that the manufacturing conditions were changed as shown in Table 3. That is, a soot body was manufactured under the conditions of a burner interval of 100 mm, a swing distance L of 100 mm, a swing speed S of 200 mm/min (constant), and a surface peripheral speed of 13 m/min (constant), and the target was extracted from the soot body to provide a hollow porous quartz glass preform. Results for the resultant hollow porous quartz glass preform are shown in Table 4, and measurement results for a synthetic quartz glass cylinder are shown in Table 5.

When the soot body is grown to an OD of 600 mm from a target OD of 50 mm, under the above-mentioned conditions, the rotation number is decreased from 82.8 rpm to 6.9 rpm. In that case, the lowest rotation number $N_m$ is 6.9 rpm, and hence $\gamma=0.29$.

As a result, the growth was able to be performed without vibration or the like of the apparatus during the growth, and there was no crack in the soot body. Thus, a large-sized hollow porous quartz glass preform having an outer diameter of 600 mm, an overall length of 2,500 mm, and a weight of 402 kg was able to be produced.

The average density of the resultant soot body as a whole and fluctuation in density thereof were measured. For the fluctuation in density, densities per unit length at four points at X=200 mm in FIG. 6 were calculated. The average density of the soot body as a whole was 0.57 g/cm³, and the density fluctuation per unit length among positions of 200 mm from the inner surface in four directions was 3.7%/cm with respect to the average value of the four points, that is, a hollow porous quartz glass preform having an extremely small density fluctuation amount was obtained.

The resultant hollow porous quartz glass preform was subjected to dehydrating treatment under a chlorine atmosphere and made transparent by sintering to provide a synthetic quartz glass cylinder having an outer diameter of 350 mm, an inner diameter of 45 mm or less, and a length of 1.9 m. The resultant synthetic quartz glass cylinder was free of any appearance failure portion resulting from a crack of a porous member, and hence had a satisfactory appearance.

The chlorine concentration and OH group concentration of the resultant quartz glass cylinder were measured. With regard to fluctuation in chlorine concentration, the difference between the maximum and the minimum of chlorine concentrations at four positions at 90° intervals 100 mm away from the inner surface in a cylindrical cross-section in the peripheral direction was measured, and the ratio thereof to the average value of the four points was calculated.

The results of the measurement of the chlorine content concentrations in four directions in the peripheral direction of the cylinder revealed that the chlorine content concentrations were from 1,890 ppm to 2,170 ppm. The maximum difference between the four directions was as small as 280 ppm, and the fluctuation amount with respect to the average value of the four directions was 14.1%, that is, a homogeneous product was obtained. In addition, the OH group content concentration (OH group) was less than 1 ppm.

Further, a soot body produced under the same conditions was dehydrated by heating without chlorine treatment, and was then made transparent by sintering to provide a synthetic quartz glass cylinder having an outer diameter of 350 mm, an inner diameter of 45 mm or less, and a length of 1.9 m. The resultant synthetic quartz glass cylinder was free of any appearance failure portion resulting from a crack of a porous member, and hence had a satisfactory appearance.

The chlorine concentration and OH group concentration of the resultant quartz glass cylinder were measured. With regard to fluctuation in OH group concentration, the difference between the maximum and the minimum of OH group concentrations at four positions at 90° intervals 50 mm away from the inner surface in a cylindrical cross-section in the peripheral direction was measured, and the ratio thereof to the average value of the four points was calculated.

The measurement of the OH group content concentrations in four directions in the peripheral direction of the cylinder revealed that the OH group content concentrations were from 225 ppm to 250 ppm. Thus, it was found that, also in this case, the maximum difference between the four directions was as small as 25 ppm, and the fluctuation amount with respect to the average value of the four directions was 10.5%, indicating homogeneity. In addition, the chlorine content concentration was less than 20 ppm.

Example 6

A hollow porous quartz glass preform was obtained by the same method as that of Example 1 except that the manufacturing conditions were changed as shown in Table 3. That is, a soot body was manufactured under the conditions of a burner interval of 100 mm, a swing distance L of 100 mm, a swing speed S of 400 mm/min (constant), and a surface peripheral speed of 9 m/min (constant), and the target was extracted from the soot body to provide a hollow porous quartz glass preform. Results for the resultant hollow porous quartz glass preform are shown in Table 4, and measurement results for a synthetic quartz glass cylinder are shown in Table 5.

When the soot body is grown to an OD of 600 mm from a target OD of 50 mm, under the above-mentioned conditions, the rotation number is decreased from 57.3 rpm to 4.8 rpm. In that case, the lowest rotation number $N_m$ is 4.8 rpm, and hence $\gamma=0.84$.

As a result, the growth was able to be performed without vibration or the like of the apparatus during the growth, and there was no crack in the soot body. Thus, a large-sized hollow porous quartz glass preform having an outer diameter of 600 mm, an overall length of 2,500 mm, and a weight of 402 kg was able to be produced.

The average density of the resultant soot body as a whole and fluctuation in density thereof were measured. For the fluctuation in density, densities per unit length at four points at X=200 mm in FIG. 6 were calculated. The average density of the soot body as a whole was 0.57 g/cm³, and the density fluctuation per unit length among positions of 200 mm from the inner surface in four directions was 8.3%/cm with respect to the average value of the four points.

The resultant hollow porous quartz glass preform was subjected to dehydrating treatment under a chlorine atmosphere and made transparent by sintering to provide a synthetic quartz glass cylinder having an outer diameter of 350 mm, an inner diameter of 45 mm or less, and a length of 1.9 m. The resultant synthetic quartz glass cylinder was free of any appearance failure portion resulting from a crack of a porous member, and hence had a satisfactory appearance.

The chlorine concentration and OH group concentration of the resultant quartz glass cylinder were measured. With regard to fluctuation in chlorine concentration, the difference between the maximum and the minimum of chlorine concentrations at four positions at 90° intervals 100 mm away from the inner surface in a cylindrical cross-section in the peripheral direction was measured, and the ratio thereof to the average value of the four points was calculated.

The results of the measurement of the chlorine content concentrations in four directions in the peripheral direction of the cylinder revealed that the chlorine content concentrations were from 1,725 ppm to 2,340 ppm. The maximum difference between the four directions was as large as 615 ppm, and the fluctuation amount with respect to the average value of the four directions was 29.1%, that is, homogeneity was lowered as compared to that of each of Examples 4 and 5. In addition, the OH group content concentration (OH group) was less than 1 ppm.

Further, a soot body produced under the same conditions was dehydrated by heating without chlorine treatment, and was then made transparent by sintering to provide a synthetic quartz glass cylinder having an outer diameter of 350 mm, an inner diameter of 45 mm or less, and a length of 1.9 m. The resultant synthetic quartz glass cylinder was free of any appearance failure portion resulting from a crack of a porous member, and hence had a satisfactory appearance.

The chlorine concentration and OH group concentration of the resultant quartz glass cylinder were measured. With regard to fluctuation in OH group concentration, the difference between the maximum and the minimum of OH group concentrations at four positions at 90° intervals 50 mm away from the inner surface in a cylindrical cross-section in the peripheral direction was measured, and the ratio thereof to the average value of the four points was calculated.

The measurement of the OH group content concentrations in four directions in the peripheral direction of the cylinder revealed that the OH group content concentrations were from 200 ppm to 250 ppm. Thus, it was found that, also in this case, the maximum difference between the four directions was as comparably large as 50 ppm, and the fluctuation amount with respect to the average value of the four directions was 21.7%, that is, homogeneity was lowered as compared to that of each of Examples 4 and 5. In addition, the chlorine content concentration was less than 20 ppm.

Example 7

A hollow porous quartz glass preform was obtained by the same method as that of Example 1 except that the manufacturing conditions were changed as shown in Table 3. That is, a soot body was manufactured under the conditions of a burner interval of 100 mm, a swing distance L of 100 mm, a swing speed S of 200 mm/min (constant), and a surface peripheral speed of 13 m/min (constant), and under the condition of a wobbling shift amount $\alpha$ of 4 mm per swing (In this case, the application diameter of a flame was 28 mm, and hence the wobbling shift amount was $\frac{1}{7}$ of the application diameter of the flame), and the target was extracted from the soot body to provide a hollow porous quartz glass preform. Results for the resultant hollow porous quartz glass preform are shown in Table 4, and measurement results for a synthetic quartz glass cylinder are shown in Table 5.

When the soot body is grown to an OD of 600 mm from a target OD of 50 mm, under the above-mentioned conditions, the rotation number is decreased from 82.8 rpm to 6.9 rpm. In that case, the lowest rotation number $N_m$ is 6.9 rpm, and hence $\gamma=0.29$.

As a result, the growth was able to be performed without vibration or the like of the apparatus during the growth, and there was no crack in the soot body. Thus, a large-sized hollow porous quartz glass preform having an outer diameter of 600 mm, an overall length of 2,500 mm, and a weight of 402 kg was able to be produced.

The average density of the resultant soot body as a whole and fluctuation in density thereof were measured. For the fluctuation in density, densities per unit length at four points at X=200 mm in FIG. 6 were calculated. The average density of the soot body as a whole was 0.57 g/cm$^3$, and the density fluctuation per unit length among positions of 200 mm from the inner surface in four directions was 1.8%/cm with respect to the average value of the four points, that is, a hollow porous quartz glass preform having an extremely small density fluctuation amount was obtained.

The resultant hollow porous quartz glass preform was subjected to dehydrating treatment under a chlorine atmosphere and made transparent by sintering to provide a synthetic quartz glass cylinder having an outer diameter of 350 mm, an inner diameter of 45 mm or less, and a length of 1.9 m. The resultant synthetic quartz glass cylinder was free of any appearance failure portion resulting from a crack of a porous member, and hence had a satisfactory appearance.

The chlorine concentration and OH group concentration of the resultant quartz glass cylinder were measured. With regard to fluctuation in chlorine concentration, the difference between the maximum and the minimum of chlorine concentrations at four positions at 90° intervals 100 mm away from the inner surface in a cylindrical cross-section in the peripheral direction was measured, and the ratio thereof to the average value of the four points was calculated.

The results of the measurement of the chlorine content concentrations in four directions in the peripheral direction of the cylinder revealed that the chlorine content concentrations were from 1,770 ppm to 1,935 ppm. The maximum difference between the four directions was as small as 165 ppm, and the fluctuation amount with respect to the average value of the four directions was 8.8%, that is, a homogeneous product was obtained. In addition, the OH group content concentration (OH group) was less than 1 ppm.

Further, a soot body produced under the same conditions was dehydrated by heating without chlorine treatment, and was then made transparent by sintering to provide a synthetic quartz glass cylinder having an outer diameter of 350 mm, an inner diameter of 45 mm or less, and a length of 1.9 m. The resultant synthetic quartz glass cylinder was free of any appearance failure portion resulting from a crack of a porous member, and hence had a satisfactory appearance.

The chlorine concentration and OH group concentration of the resultant quartz glass cylinder were measured. With regard to fluctuation in OH group concentration, the difference between the maximum and the minimum of OH group concentrations at four positions at 90° intervals 50 mm away from the inner surface in a cylindrical cross-section in the peripheral direction was measured, and the ratio thereof to the average value of the four points was calculated.

The measurement of the OH group content concentrations in four directions in the peripheral direction of the cylinder revealed that the OH group content concentrations were from 205 ppm to 225 ppm. Thus, it was found that, also in this case, the maximum difference between the four directions was as small as 20 ppm, and the fluctuation amount with respect to the average value of the four directions was 9.4%, indicating homogeneity. In addition, the chlorine content concentration was less than 20 ppm.

Comparative Example 1

Manufacturing a hollow porous quartz glass preform was performed by the same method as that of Example 1 except that the manufacturing conditions were changed as shown in Table 3. That is, an attempt was made to manufacture a soot body under the conditions of a burner interval of 100 mm, a swing distance L of 100 mm, a swing speed S of 140 mm/min (constant), and a surface peripheral speed of 18 m/min (constant).

When the soot body is grown to an OD of 400 mm from a target OD of 50 mm, under the above-mentioned conditions, the rotation number is decreased from 114.6 rpm to 14.3 rpm. However, vibration of the apparatus started around a time when the OD of the soot body exceeded 200 mm, and then the vibration was large at a time point when the OD exceeded 250 mm. For this reason, the manufacturing was stopped midway, and the manufacturing was unable to be continued to an OD of 400.

Comparative Example 2

Manufacturing a hollow porous quartz glass preform was performed by the same method as that of Example 1 except that the manufacturing conditions were changed as shown in Table 3. That is, a soot body was manufactured under the conditions of a burner interval of 100 mm, a swing distance L of 100 mm, a swing speed S of 800 mm/min (constant), and a surface peripheral speed of 9 m/min (constant), and the target was extracted from the soot body to provide a hollow porous quartz glass preform. Results for the resultant hollow porous quartz glass preform are shown in Table 4.

When the soot body is grown to an OD of 400 mm from a target OD of 50 mm, under the above-mentioned conditions, the rotation number is decreased from 57.3 rpm to 7.2 rpm. In that case, the lowest rotation number $N_m$ is 7.2 rpm, and hence $\gamma=1.12$. As a result, the growth was able to be performed without vibration or the like of the apparatus during the growth. However, a crack was formed in the soot body at a time when the OD of the soot body reached around 300 mm, and hence the manufacturing was unable to be continued.

Comparative Example 3

Manufacturing a hollow porous quartz glass preform was performed by the same method as that of Example 1 except that the manufacturing conditions were changed as shown in Table 3. That is, a soot body was manufactured under the conditions of a burner interval of 100 mm, a swing distance L of 100 mm, a swing speed S of 800 mm/min (constant), and a surface peripheral speed of 9 m/min (constant), and under the condition of a wobbling shift amount α of 4 mm per swing (In this case, the application diameter of a flame was 28 mm, and hence the wobbling shift amount was 1/7 of the application diameter of the flame. A measurement method for the flame diameter was image analysis of the flame during the growth of the soot body), and the target was extracted from the soot body to provide a hollow porous quartz glass preform. Results for the resultant hollow porous quartz glass preform are shown in Table 4.

When the soot body is grown to an OD of 400 mm from a target OD of 50 mm, under the above-mentioned conditions, the rotation number is decreased from 57.3 rpm to 7.2 rpm. In that case, the lowest rotation number $N_m$ is 7.2 rpm, and hence $\gamma=1.12$. As a result, the growth was able to be performed without vibration or the like of the apparatus during the growth. However, also in this case, a crack was formed in the soot body at a time when the OD of the soot body reached around 350 mm, and hence the manufacturing was unable to be continued.

REFERENCE SIGNS LIST

10: manufacturing apparatus, 12: soot body, 14: target, 16: burner group for synthesizing glass fine particles, 16a: burner for synthesizing glass fine particles, 18: swing and up-and-down movement controller of the burner group for synthesizing glass fine particles, 20: target holding and rotating mechanism, 22: burner flame, d: application diameter of a flame, L: swing distance, b: burner interval, α: wobbling shift amount.

What is claimed is:

1. A large-sized hollow porous quartz glass preform of a cylindrical shape having an outer diameter of more than 300 mm and a length of 2 m or more, wherein the preform has an average density of 0.56 g/cm³ or more and 0.77 g/cm³ or less as a whole, wherein a density fluctuation amount per unit length among four points, each located at a distance of 105 mm from an inner surface in a radial direction in four directions at 90° intervals in a cylindrical cross-section is 10%/cm or less with respect to an average value of the four points, and wherein the preform is free of any crack.

2. The large-sized hollow porous quartz glass preform according to claim 1, wherein the large-sized hollow porous quartz glass preform is obtained by a method comprising the steps of:

arranging a plurality of burners for synthesizing glass fine particles at predetermined intervals and subjecting the burners to reciprocating movement to deposit glass fine particles on a rotating target, to thereby grow a soot body; and extracting the target from the soot body, to thereby manufacture a hollow porous quartz glass preform, wherein a rotation peripheral speed of the soot body is controlled so as to be practically constant by fluctuating a rotation number of the soot body on the basis of a fluctuating outer diameter of the soot body during growth, and wherein a frequency factor γ calculated by the following equation (1) is set so as to fall within a range of the following expression (2) in a range in which the outer diameter of the soot body is more than 250 mm:

$$\gamma = S/(L \cdot N_m) \tag{1}$$

$$0.13 \leq \gamma < 1.0 \tag{2}$$

in the equation (1), S represents a moving speed (mm/min) of the burners, L represents a moving distance (mm) of the burners, and $N_m$ represents a lowest value (rpm) of the rotation number of the soot body, which is fluctuated.

3. The large-sized hollow porous quartz glass preform according to claim 2, wherein the method to obtain the large-sized hollow porous quartz glass preform further comprises moving a turning position in the reciprocating movement of the burners by a predetermined distance, wherein a movement amount of the turning position in one to-and-fro cycle of the burners is 1/3 or less of a flame diameter of each of the burners applied to the soot body.

4. The large-sized hollow porous quartz glass preform according to claim 2, wherein the frequency factor γ is 0.13 or more and 0.3 or less.

5. The large-sized hollow porous quartz glass preform according to claim 2, wherein the method uses the obtained large-sized hollow porous quartz glass preform to obtain a synthetic quartz glass cylinder.

6. A hollow synthetic quartz glass cylinder, which is obtained by dehydrating and vitrifying the hollow porous quartz glass preform of claim 1, has an outer diameter of from 200 mm to 500 mm, a length of from 0.7 m to 3.5 m, an OH group concentration of less than 5 ppm, and a chlorine content concentration of 500 ppm or more and 3,000 ppm or less, and is free of any appearance failure portion resulting from a crack of a porous member.

7. The hollow synthetic quartz glass cylinder according to claim 6, wherein a "maximum-minimum difference" of chlorine concentrations at four positions at 90° intervals in a peripheral direction at equal distances from an inner surface in a cylindrical cross-section of the hollow synthetic quartz glass cylinder is within 15% with respect to an average value of the four positions.

8. A hollow synthetic quartz glass cylinder, which is obtained by pre-sintering and vitrifying the hollow porous quartz glass preform of claim 5, has an outer diameter of from 200 mm to 500 mm, a length of from 0.7 m to 3.5 m, and an OH group concentration of 50 ppm or more and 500 ppm or less, and is free of any appearance failure portion resulting from a crack of a porous member.

9. The hollow synthetic quartz glass cylinder according to claim 8, wherein a "maximum-minimum difference" of OH group concentrations at four positions at 90° intervals in a peripheral direction at equal distances from an inner surface in a cylindrical cross-section of the hollow synthetic quartz glass cylinder is within 15% with respect to an average value of the four positions.

10. The large-sized hollow porous quartz glass preform according to claim 1, wherein the cylindrical cross-section is 2%/cm or less with respect to an average value of the four points.

11. A large-sized hollow porous quartz glass preform of a cylindrical shape having an outer diameter of 500 mm or more and a length of 1.0 m or more, wherein the preform has an average density of 0.56 g/cm³ or more and 0.77 g/cm³ or less as a whole, wherein a density fluctuation amount per unit length among four points, each located at a distance of 105 mm from an inner surface in a radial direction in four directions at 90° intervals in a cylindrical cross-section is 10%/cm or less with respect to an average value of the four points, and wherein the preform is free of any crack.

12. The large-sized hollow porous quartz glass preform according to claim 11, wherein the large-sized hollow porous quartz glass preform is obtained by a method comprising the steps of:

arranging a plurality of burners for synthesizing glass fine particles at predetermined intervals and subjecting the burners to reciprocating movement to deposit glass fine particles on a rotating target, to thereby grow a soot body; and extracting the target from the soot body, to thereby manufacture a hollow porous quartz glass preform, wherein a rotation peripheral speed of the soot body is controlled so as to be practically constant by fluctuating a rotation number of the soot body on the basis of a fluctuating outer diameter of the soot body during growth, and wherein a frequency factor γ calculated by the following equation (1) is set so as to fall within a range of the following expression (2) in a range in which the outer diameter of the soot body is more than 250 mm:

$$\gamma = S/(L \cdot N_m) \tag{1}$$

$$0.13 \leq \gamma < 1.0 \tag{2}$$

in the equation (1), S represents a moving speed (mm/min) of the burners, L represents a moving distance (mm) of the burners, and $N_m$ represents a lowest value (rpm) of the rotation number of the soot body, which is fluctuated.

13. The large-sized hollow porous quartz glass preform according to claim 12, wherein the method to obtain the large-sized hollow porous quartz glass preform further comprises moving a turning position in the reciprocating movement of the burners by a predetermined distance, wherein a movement amount of the turning position in one to-and-fro cycle of the burners is ⅓ or less of a flame diameter of each of the burners applied to the soot body.

14. The large-sized hollow porous quartz glass preform according to claim 12, wherein the frequency factor γ is 0.13 or more and 0.3 or less.

15. The large-sized hollow porous quartz glass preform according to claim 12, wherein the uses the obtained large-sized hollow porous quartz glass preform to obtain a synthetic quartz glass cylinder.

16. The large-sized hollow porous quartz glass preform according to claim 11, wherein the cylindrical cross-section is 2%/cm or less with respect to an average value of the four points.

* * * * *